(12) United States Patent
Keegan et al.

(10) Patent No.: US 11,427,114 B2
(45) Date of Patent: Aug. 30, 2022

(54) BOOSTER SEAT TO BASE ATTACHMENT MECHANISM

(71) Applicant: Evenflo Company, Inc., Miamisburg, OH (US)

(72) Inventors: Charles H. Keegan, Milton, MA (US); Phillip Przybylo, Waxhaw, NC (US)

(73) Assignee: Evenflo Company, Inc., Miamisburg, OH (US)

( * ) Notice: Subject to any disclaimer, the term of this patent is extended or adjusted under 35 U.S.C. 154(b) by 0 days.

(21) Appl. No.: 16/993,365

(22) Filed: Aug. 14, 2020

(65) Prior Publication Data

US 2022/0048414 A1  Feb. 17, 2022

(51) Int. Cl.
*B60N 2/28* (2006.01)

(52) U.S. Cl.
CPC ......... *B60N 2/2869* (2013.01); *B60N 2/2803* (2013.01); *B60N 2/2821* (2013.01); *B60N 2/2875* (2013.01); *B60N 2002/2815* (2013.01)

(58) Field of Classification Search
CPC .. B60N 2/2869; B60N 2/2803; B60N 2/2821; B60N 2/2875; B60N 2002/2815
See application file for complete search history.

(56) References Cited

U.S. PATENT DOCUMENTS

| | | | |
|---|---|---|---|
| 7,073,859 B1 * | 7/2006 | Wilson | B60N 2/0232 297/250.1 |
| 8,322,788 B2 | 12/2012 | Williams et al. | |
| 8,459,739 B2 * | 6/2013 | Tamanouchi | B60N 2/2863 297/256.16 |
| 8,651,572 B2 * | 2/2014 | Medeiros | A47D 1/002 297/256.13 |
| 10,457,168 B2 * | 10/2019 | Anderson | B60N 2/2821 |
| 2008/0054695 A1 * | 3/2008 | Lhomme | B60N 2/2821 297/256.12 |
| 2018/0264977 A1 * | 9/2018 | Anderson | B60N 2/2821 |
| 2019/0077282 A1 * | 3/2019 | Reaves | B60N 2/2869 |
| 2019/0176662 A1 | 6/2019 | Pleiman et al. | |
| 2021/0237626 A1 | 8/2021 | Longenecker et al. | |

OTHER PUBLICATIONS

Non Final Office Action dated Dec. 21, 2021 in U.S. Appl. No. 16/993,365, 10 pages.

* cited by examiner

*Primary Examiner* — Philip F Gabler

(74) *Attorney, Agent, or Firm* — Shook, Hardy & Bacon L.L.P.

(57) ABSTRACT

Disclosed herein is a car seat comprised of a base and a shell. The base includes a receiving portion and a backing portion. The seat shell includes a seat back and a seat bottom having a lower portion. The seat bottom interfaces with the receiving portion of the base. The seat shell is removably attached to the base and rotatable with respect to the base. The seat shell is selectively positionable between a plurality of orientations. A recline mechanism is configured to permit the seat shell to recline with respect to the base. The seat shell is selectively reclinable between a plurality of recline positions. The seat shell includes handles configured to independently unlock rotation of the seat shell with respect to the base. The lower portion of the seat shell includes an aperture configured to receive at least a portion of a projection of the base therethrough.

23 Claims, 23 Drawing Sheets

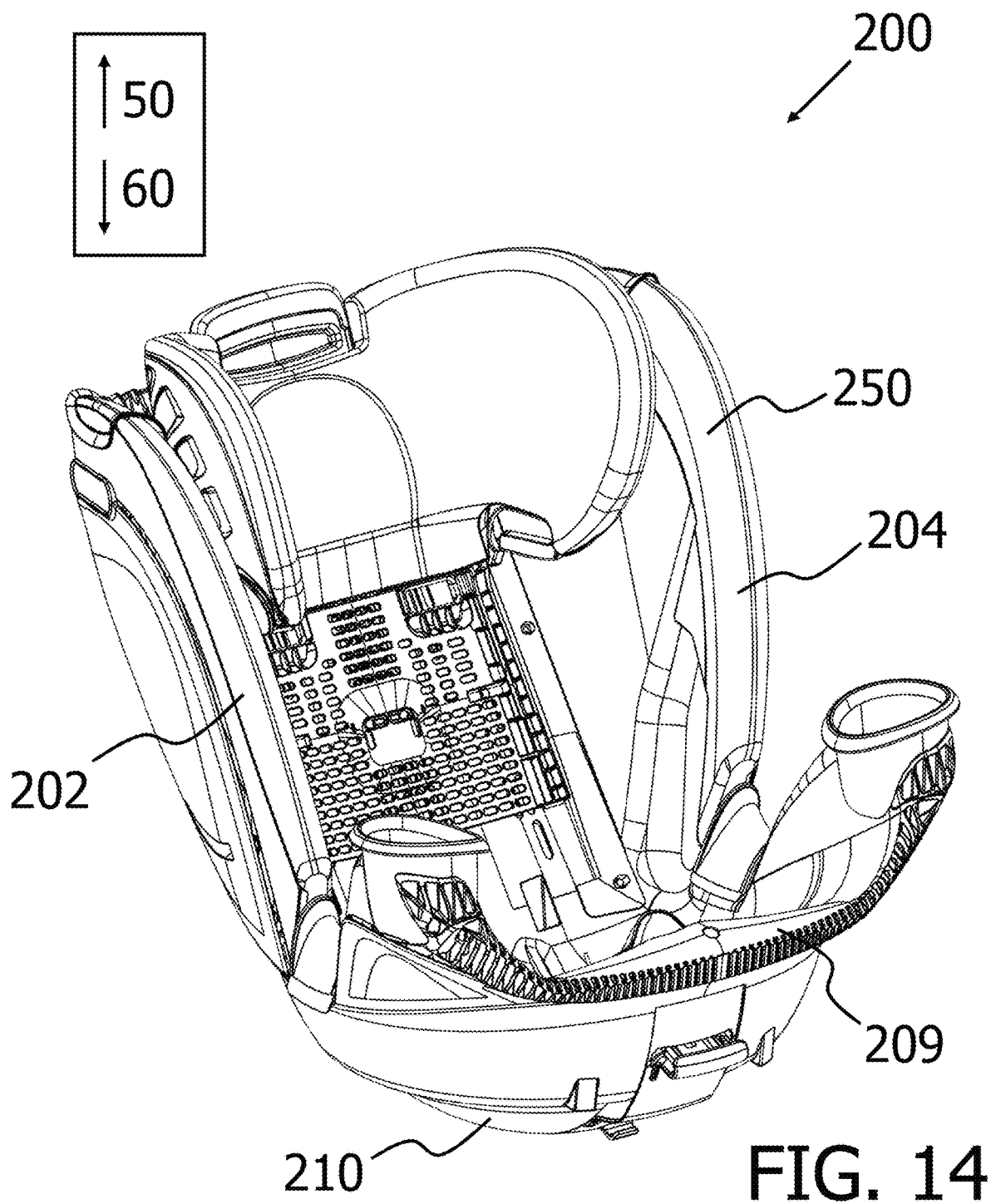

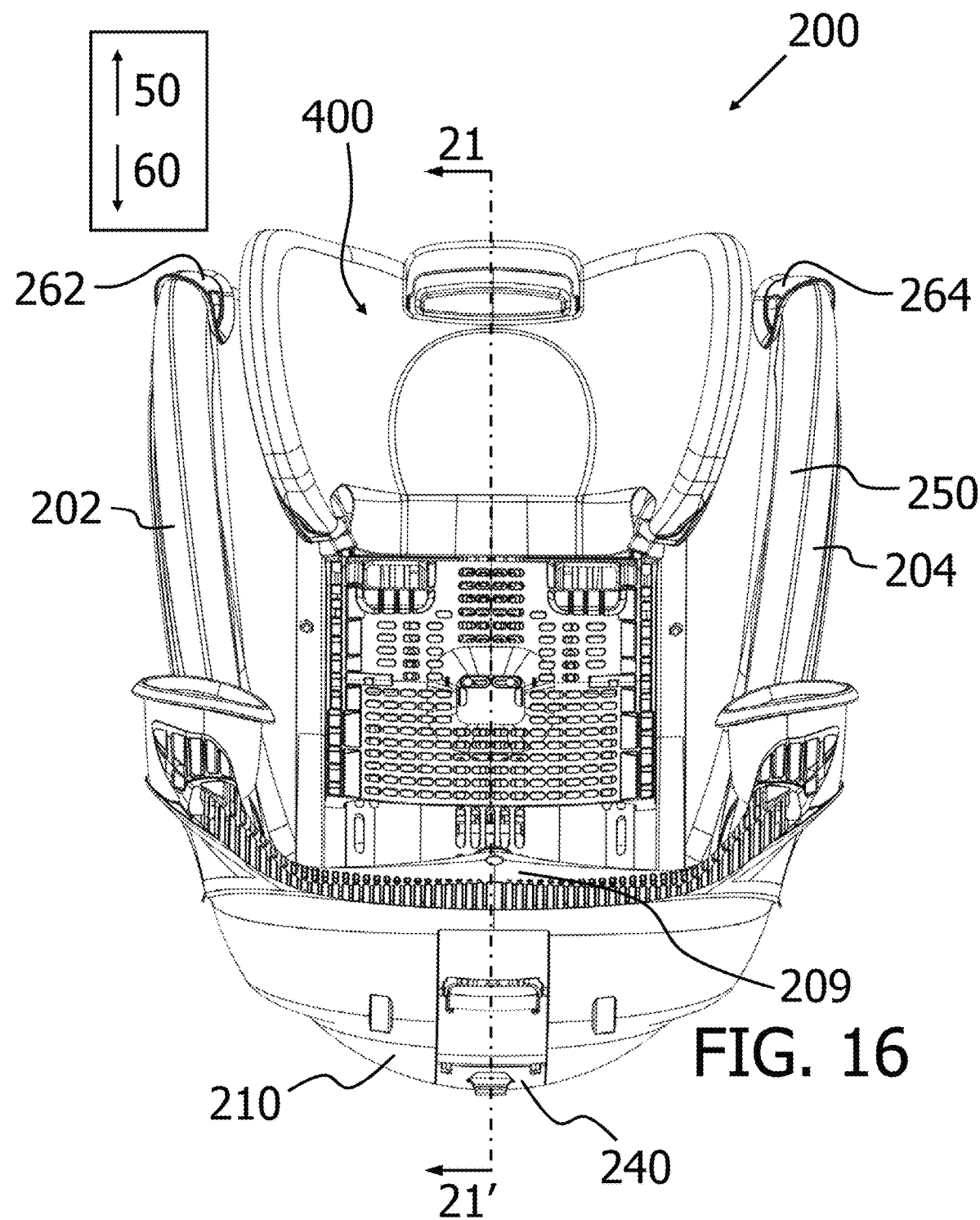

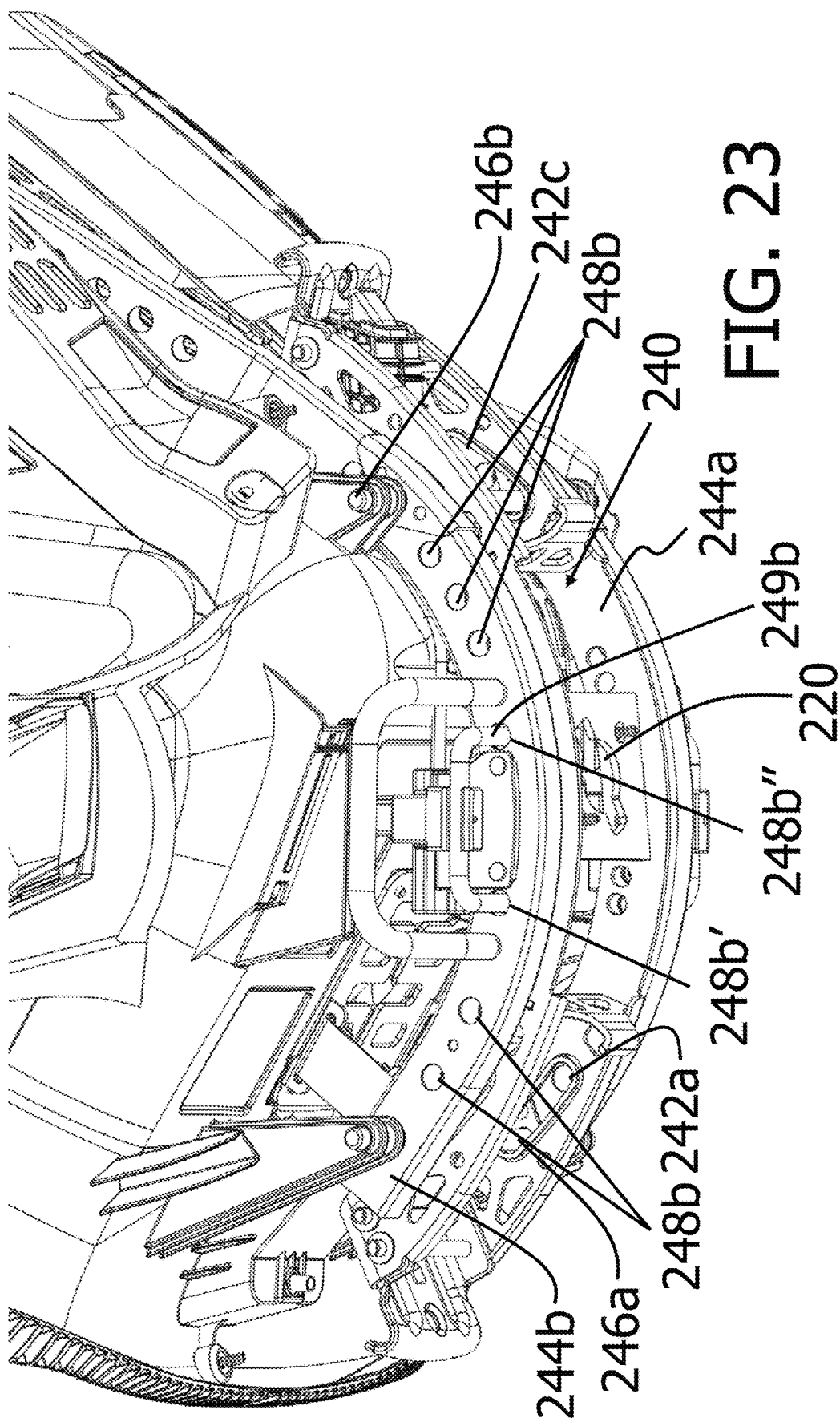

BOOSTER SEAT TO BASE ATTACHMENT MECHANISM

TECHNICAL FIELD

The present disclosure relates generally to car seats for use in motor vehicles. More particularly, the present disclosure relates to car seats comprised of a base and a seat shell removably attached to the base and rotatable with respect to the base such that the seat shell is selectively positionable between a plurality of positions (e.g., a rearward-facing position, a forward-facing position, an intermediate loading position).

BACKGROUND

In the United States, child car seats are required by law and recommended for children of certain ages or sizes. There are many types of car seats available for purchase. Infant car seats recommended for children under age 1 are typically rear-facing. Many infant car seats include a base that is belted or tethered into the car and a seat that may latch into the base. A popular car seat option for infants as well as children is a "convertible" car seat that may be oriented in a rear-facing position and then "converted" to a front-facing position for accommodating older children.

Conventional convertible car seats are typically designed in such a way that the seat may be uninstalled and reinstalled into the base in order to reposition the seat (e.g., to switch the orientation of the seat or the recline of the seat).

It would be desirable to provide a car seat with seat shell that is removably and rotatably attached to the base. It would further be desirable if such a car seat included a seat shell that is selectively rotatable with respect to the base so as to be positionable between at least a forward-facing position and a rearward-facing position. It would also be desirable if such a car seat included a seat shell that is selectively reclinable with respect to the base so as to be positionable between at least an upright position and at least one reclined position.

BRIEF SUMMARY

Disclosed herein are car seats. The car seats may be configured to be installed in an associated vehicle. The car seats may be installed in the vehicle using a tether, such as a safety belt of the vehicle (e.g., an existing lap belt of the vehicle) or a LATCH system provided with the car seat. The car seats may be comprised of a base and a seat shell.

The base may include a receiving portion. The base may, in certain constructions, further include a backing portion. The backing portion may extend upwardly away from the receiving portion.

The seat shell may include a seat bottom. The seat bottom may interface with the receiving portion of the base. The seat shell may, in certain constructions, further include a seat back. The seat back may extend upwardly away from the seat bottom. The seat shell may, in certain constructions, include a lower portion. The lower portion may be part of the seat bottom. The lower portion of the seat bottom may interface with the receiving portion of the base.

The seat shell may be removably attached to the base. The seat shell may be rotatable with respect to the base such that the seat shell is selectively positionable between a plurality of positions (e.g., a rearward-facing position, a forward-facing position, an intermediate loading position). In embodiments, the seat shell may specifically be rotatable with respect to the base such that the seat shell is selectively positionable between at least the rearward-facing position and the forward-facing position.

In particular embodiments, the receiving portion of the base may be curved or concave so as to at least partially define a bowl shape. In further embodiments, the lower portion of the seat shell may be curved or convex so as to at least partially define a dome shape.

The receiving portion of the base may, in certain constructions, be shaped complementary to the lower portion of the seat shell so as to retard the ability for debris to enter between the seat shell and the base as the seat shell is rotated with respect to the base.

In certain constructions, the car seat may include a recline mechanism. The recline mechanism may be part of the seat bottom. The recline mechanism may be configured to permit the seat shell to recline with respect to the base such that the seat shell is selectively reclinable between a plurality of positions (e.g., an upright position, a fully-reclined position, an intermediate-reclined position). In embodiments, the seat shell may specifically be reclinable with respect to the base such that the seat shell is selectively positionable between at least the upright position and at least one reclined position (e.g., a fully-reclined position, an intermediate-reclined position).

The recline mechanism may, in certain embodiments, include at least one elongate track. The track may be configured to receive a first rod of the seat shell therethrough. The first rod may be adapted for movement within the track as the seat shell is reclined with respect to the base. The recline mechanism may, in certain embodiments, further define a plurality of openings. Each of the plurality of openings may be configured to selectively receive a second rod of the seat shell therethrough. Each of the plurality of openings may also define a discrete recline position. Each of the plurality of openings may be configured to selectively receive the tube of the seat shell therethrough for selectively positioning the seat shell in a discrete recline position. One of the plurality of openings may define the upright position. Another of the plurality of openings may define the at least one reclined position.

In particular embodiments, a belt path may extend across the base. The belt path may be configured to receive a tether therealong. The belt path may be positioned above the lower portion of the seat shell when the seat shell is in the forward-facing position. The belt path may also be positioned rearward of the lower portion of the seat shell when the seat shell is in the forward-facing position. The seat shell may be rotatable and/or reclinable with respect to the base without interfering with the belt path.

In exemplary embodiments, the car seat may include a projection extending upwardly away from an inner surface of the receiving portion of the base. The car seat may further include an aperture in the lower portion of the seat shell. The aperture may be configured to receive at least a portion of the projection of the base therethrough. In other, alternative embodiments, the car seat may include a projection extending outwardly away from an outer surface of the seat bottom of the seat shell. The car seat may further include an aperture in the receiving portion of the base. The aperture may be configured to receive at least a portion of the projection of the seat shell therethrough.

In certain constructions, the projection extending upwardly away from an inner surface of the receiving portion of the base may include a pedestal. The projection may further include a post extending upwardly away from the pedestal. Further yet, the projection may include a plurality of flanges. The flanges may be spaced apart from one another about the post. The flanges may extend outwardly away from the post. In certain embodiments, the pedestal may be shaped so as to at least partially define a cone shape extending upwardly away from the inner surface of the receiving portion of the base such that any debris that has collected between the seat shell and the base is retarded from substantially encumbering rotation of the seat shell with respect to the base.

In particular embodiments, an outer surface of the seat bottom may include a recessed portion. The recessed portion my be shaped complementary to the pedestal of the projection. The pedestal of the projection may be at least partially received in the recessed portion. The aperture in the lower portion of the seat shell may be shaped complementary to the post and the plurality of flanges of the projection. The plurality of flanges and at least a portion of the post may be received through the aperture.

In exemplary embodiments, the car seat may include an adjustable assembly mounted for sliding movement relative to the seat shell and selectively positionable with respect to the seat shell. The adjustable assembly may include at least a headrest member. The adjustable assembly may further include a backrest member.

The car seat may, in certain embodiments, be configured to be installed in an associated vehicle using a tether (e.g., an existing safety belt of the associated vehicle, a lower anchor system). The car seat may include a belt lock off arm configured to engage (e.g., clamp and/or tension) the tether. The belt lock off mechanism may be movable between (a) an unlocked position in which the belt lock off arm does not engage (e.g., clamp and/or tension) the tether and (b) a locked position in which the belt lock off arm engages (e.g., clamps and/or tensions) the tether. In embodiments, the belt lock off arm may include an indicator configured to indicate whether the belt lock off arm is in the unlocked position or the locked position.

The base may be configured to lock rotation of the seat shell with respect to the base in the rearward-facing position and the forward-facing position.

In certain constructions, the base may include a first indicator on a first side of the base. The base may further include a second indicator on an opposite, second side of the base. Each of the first and second indicators may be configured to indicate whether rotation of the seat shell is locked with respect to the base. In the same or other constructions, the seat shell may include an indicator configured to indicate whether rotation of the seat shell is locked with respect to the base.

The car seat may include also include a handle configured to unlock rotation of the seat shell with respect to the base. In certain constructions, a first handle may be positioned on a first side of the seat shell. A second handle may be provided on an opposite, second side of the seat shell. The seat shell may include a locking projection on the lower portion of the seat shell. The locking projection may be configured to engage with the base so as to lock rotation of the seat shell with respect to the base in the rearward-facing position and the forward-facing position. Each of the first and second handles may be operatively connected to the locking projection. Each of the first and second handles may be configured to independently move the locking projection out of engagement with the base so as to unlock rotation of the seat shell with respect to the base.

In particular embodiments, the car seat may include abutment features. In certain constructions, a first abutment feature may be located on the lower portion of the seat shell proximate a first side thereof. A second abutment feature may be located on the lower portion of the seat shell proximate an opposite, second side thereof. Each of the first and second abutment features may be configured to prevent full 360° rotation of the seat shell with respect to the base when the seat shell is in an intermediate-reclined position.

In exemplary embodiments, the seat shell may include a plurality of engagement features. The base may include a plurality of receiving features. The receiving features of the base may be shaped complementary to the engagement features of the seat shell. Each of the plurality of receiving features of the base may be configured to engage a corresponding one of the plurality of engagement features of the seat shell to guide the seat shell into the rearward-facing position or the forward-facing position. A first one of the plurality of receiving features of the base may be positioned within the receiving portion of the base and may be configured to engage a corresponding first one of the plurality of engagement features of the seat shell that is positioned on the lower portion of the seat shell. A second one of the plurality of receiving features of the base may be positioned adjacent the receiving portion of the base and may be configured to engage a corresponding second one of the plurality of engagement features of the seat shell that is positioned adjacent the lower portion of the seat shell.

In particular embodiments, the seat shell may further be selectively positionable in an intermediate position between the rearward-facing position and the forward-facing position. The intermediate position may, in certain embodiments, be a predetermined position between the rearward-facing position and the forward-facing position. In such embodiments, the predetermined intermediate position may be defined by one or more detents and/or one or more engagement features. In such embodiments, there are a finite number of intermediate positions into which the seat shell may be selectively positioned. In other embodiments, the intermediate position may be any position between the rearward-facing position and the forward-facing position such that the seat shell is freely positionable in the intermediate position. In such embodiments, there are an infinite number of intermediate positions into which the seat shell may be selectively positioned. In certain constructions, the base may include a first retainment feature on a first side of the base. The base may also include a second retainment feature on an opposite, second side of the base. The seat shell may include a first engagement feature at a forward end of the seat shell. The seat shell may further include a second engagement feature at an opposite, rear end of the seat shell. Each of the first and second retainment features of the base may be configured to engage a corresponding one of the first and second engagement features of the seat shell to retain the seat shell in the intermediate position. The first and second retainment locking features of the base may be formed as nubs or projections. The first and second engagement features of the seat shell may include an aperture or detent configured to at least partially receive a corresponding one of the nubs or projections.

In certain constructions, the car seat may include an upper tethering point proximate an upper edge of the backing portion of the base. The upper tethering point may be configured to remain stationary as the seat shell is rotated with respect to the base.

In accordance with the foregoing, disclosed in exemplary embodiments herein are car seats. In accordance with particular embodiments of the present disclosure, an exemplary car seat comprises: a base including a receiving portion; a seat shell including a seat bottom having a lower portion and a seat back extending upwardly away from the seat bottom, the seat bottom interfacing with the receiving portion of the base, wherein the seat shell is removably attached to the base and rotatable with respect to the base such that the seat shell is selectively positionable between at least a rearward-facing position and a forward-facing position; and a recline mechanism in the seat bottom, the recline mechanism configured to permit the seat shell to recline with respect to the base such that the seat shell is selectively reclinable between at least an upright position and at least one reclined position.

In accordance with other particular embodiments of the present disclosure, an exemplary car seat comprises: a base including a receiving portion; a seat shell including a seat bottom having a lower portion and a seat back extending upwardly away from the seat bottom, the seat bottom interfacing with the receiving portion of the base, wherein the seat shell is removably attached to the base and rotatable with respect to the base such that the seat shell is selectively positionable between at least a rearward-facing position and a forward-facing position; a locking projection on the lower portion of the seat shell and configured to engage the base to lock rotation of the seat shell with respect to the base in each of the rearward-facing position and the forward-facing position; and a first handle positioned on a first side of the seat shell and a second handle positioned on an opposite, second side of the seat shell, each of the first and second handles operatively connected to the locking projection and configured to independently move the locking projection out of engagement with the base so as to unlock rotation of the seat shell with respect to the base.

In accordance with other particular embodiments of the present disclosure, an exemplary car seat is configured to be installed in an associated vehicle using a tether (e.g., an existing safety belt of the associated vehicle, a lower anchor system). The car seat may comprise: a base including a receiving portion; a seat shell including a seat bottom having a lower portion and a seat back extending upwardly away from the seat bottom, the seat bottom interfacing with the receiving portion of the base, wherein the seat shell is removably attached to the base and rotatable with respect to the base such that the seat shell is selectively positionable between at least a rearward-facing position and a forward-facing position; a projection extending upwardly away from an inner surface of the receiving portion of the base; and an aperture in the lower portion of the seat shell, the aperture configured to receive at least a portion of the projection therethrough.

Other aspects of the invention may be apparent to those of ordinary skill with review of the attached drawings, appended claims, and additional description.

BRIEF DESCRIPTION OF THE DRAWINGS

The foregoing and other features of the present disclosure will become more fully apparent from the following description and appended claims, taken in conjunction with the accompanying drawings. Understanding that these drawings depict several examples in accordance with the disclosure and are, therefore, not to be considered limiting of its scope, the disclosure is described with additional specificity and detail below through the use of the accompanying drawings.

FIG. 14 is a perspective view of the seat shell of the car seat of FIG. 1.

FIG. 16 is a front view of the seat shell of FIG. 14.

FIG. 23 is a is a second side perspective cutaway view of the lower portion of the seat shell of FIG. 14 showing features of the recline mechanism.

DETAILED DESCRIPTION

Figure 1:
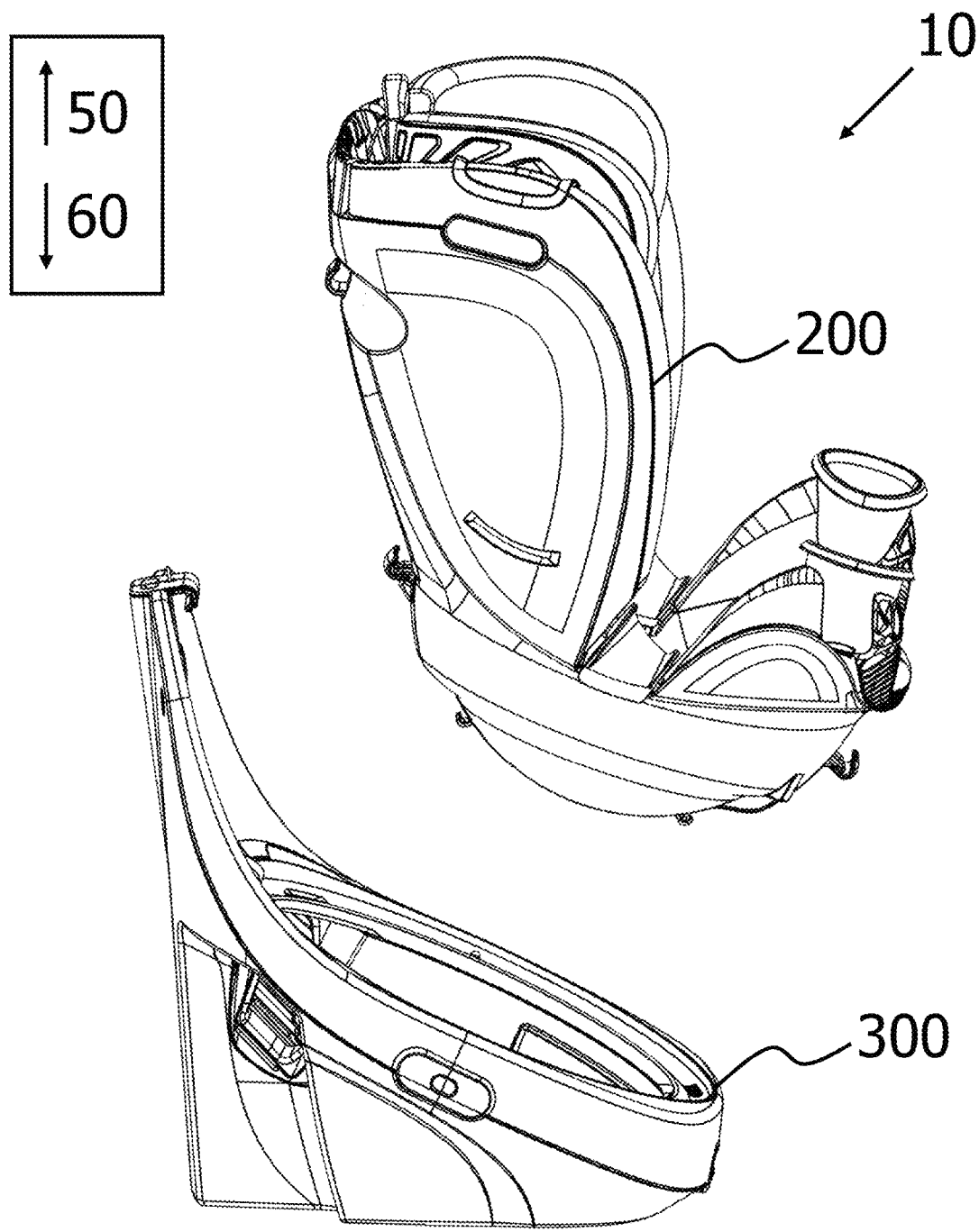
FIG. 1 is an exploded view of a car seat in accordance with the disclosure.

In the following detailed description, reference is made to the accompanying drawings, which form a part hereof. In the drawings, similar symbols identify similar components, unless context dictates otherwise. The illustrative examples described in the detailed description and drawings are not meant to be limiting and are for explanatory purposes. Other examples may be utilized, and other changes may be made, without departing from the spirit or scope of the subject matter presented herein. It will be readily understood that the aspects of the present disclosure, as generally described herein and illustrated in the drawings, may be arranged, substituted, combined, and designed in a wide variety of different configurations, each of which are explicitly contemplated and form a part of this disclosure.

It should be noted that some of the terms used herein may be relative terms. For example, the terms "upper" and "lower" and the terms "forward" and "rearward" or are relative to each other in location, i.e. an upper component is located at a higher elevation than a lower component in a given orientation, but these terms may change if the device is flipped. An intermediate component, on the other hand, is always located between an upper component and a lower component regardless of orientation. The terms "horizontal" and "vertical" are used to indicate direction relative to an absolute reference, i.e. ground level. However, these terms should not be construed to require structures to be absolutely parallel or absolutely perpendicular to each other. For example, a first vertical structure and a second vertical structure are not necessarily parallel to each other. The terms "top" and "bottom" or "base" are used to refer to surfaces where the top is always higher than the bottom/base relative to an absolute reference, i.e. the surface of the earth. The terms "upwards" or "upwardly" and "downwards" or "downwardly" are also relative to an absolute reference; upwards is always against the gravity of the earth. The terms "forward" and "rearward" or "rear" with respect to a position or orientation are opposite one another along a common direction, and an "intermediate" position is always located between a forward position and a rearward position. The term "parallel" should be construed in its lay sense of two surfaces that maintain a generally constant distance between them, and not in the strict mathematical sense that such surfaces will never intersect when extended to infinity. The terms "operative to" and "adapted to" and similar terms are used herein to describe that a particular component has certain structural features designed to perform a designated function. Such components should be construed as having the expressed structure, with the designated function being considered part of the structure. The term "engage" and similar terms are used herein to describe the interaction between particular components and does not necessarily require that such components contact one another (directly or indirectly). As used herein and as will be appreciated by those skilled in the art, the term "car seat" encompasses car seats, safety seats, restraints, boosters, and the like for children, infants, and toddlers and the like.

In accordance with aspects of the disclosure, exemplary embodiments of car seats are illustrated in various levels of specificity in FIGS. 1-20. As will be appreciated by those skilled in the art, the car seats described herein may be convertible car seats that are convertible between a forward-facing configuration, a rearward-facing configuration, and a booster configuration. The car seats of the present disclosure may be configured to support an infant, child, toddler, or the like. Very generally, car seat 10 is designed for safely transporting an infant or child in a car. As illustrated in FIG. 1, the car seat 10 generally includes a seat shell 200, which is supported on a base 300. As will be readily understood by those skilled in the art, the car seat 10 (and, namely, the base 300) may be affixed to the seat of a car, such as by a seat belt (e.g., lap belt) of the car.

As described in more detail herein, the seat shell 200 may be removably attached to the base 300. Additionally, the seat shell 200 may be rotatable with respect to the base 300. The seat shell 200 may be rotated to be selectively positionable in a variety of different positions (e.g., e.g., a rearward-facing position, a forward-facing position, an intermediate loading position).

Figure 2:
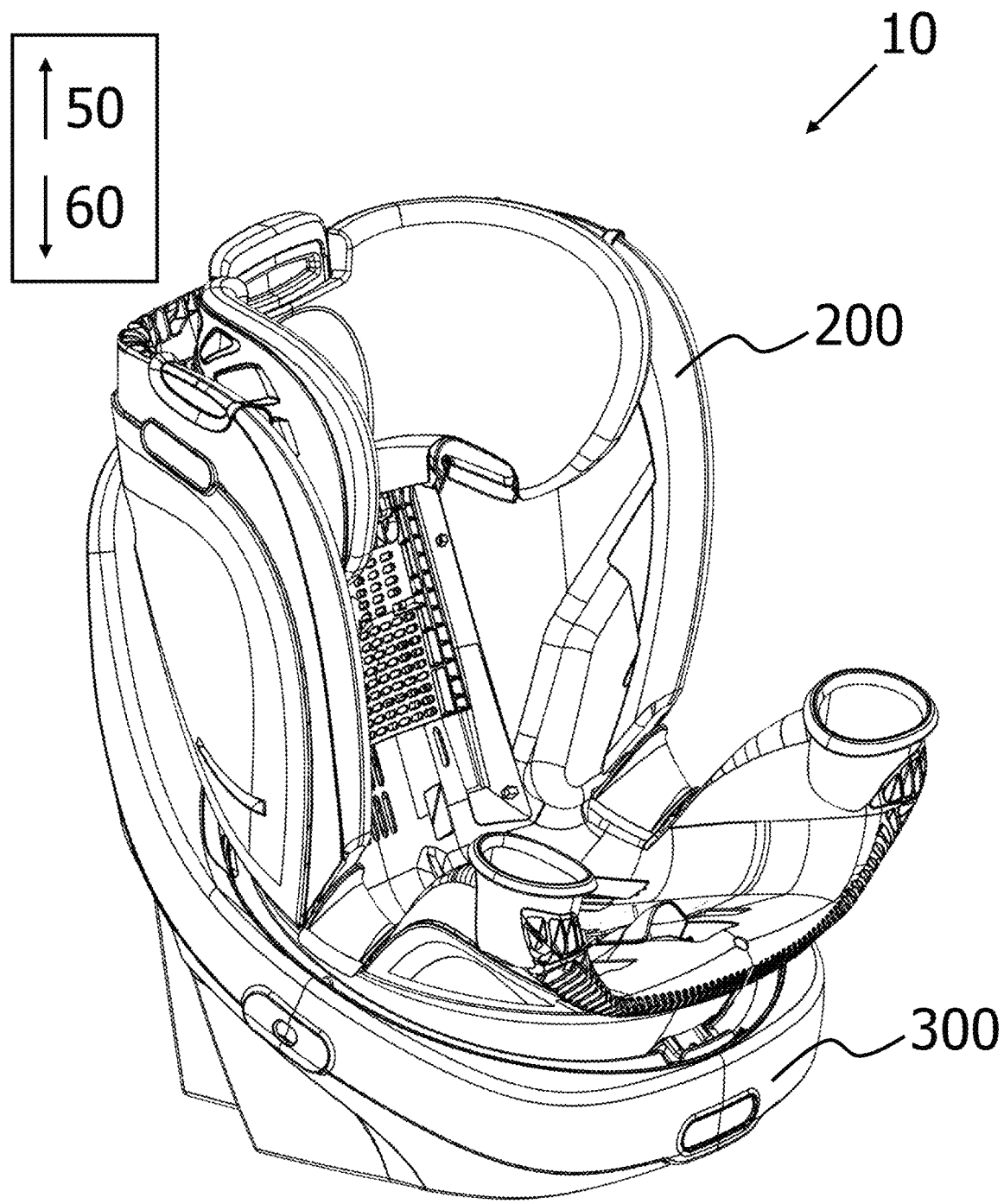
FIG. 2 is a perspective view of the car seat of FIG. 1 in a forward-facing position.
Figure 3:
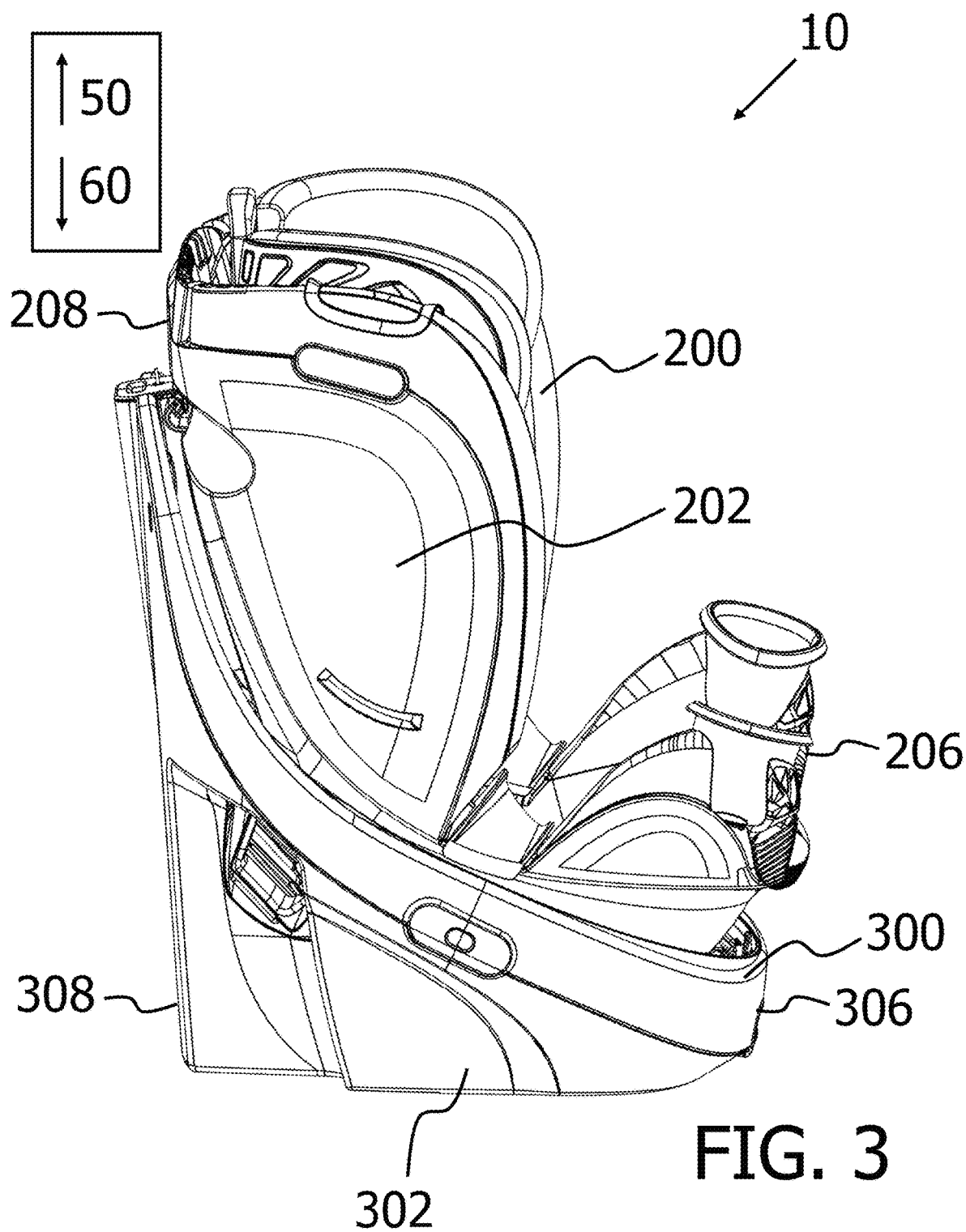
FIG. 3 is a side view of the car seat of FIG. 1 in the forward-facing position.

FIG. 2 and FIG. 3 depict the seat shell 200 supported on the base 300 in a forward-facing position. With reference to FIG. 3, in the forward-facing position, a forward end 206 of the seat shell 200 and a forward end 306 of the base 300 face a common direction (e.g., toward the forward end of the vehicle when installed), and a rear end 208 of the seat shell 200 and a rear end 308 of the base 300 face a common direction (e.g., toward the rear end of the vehicle when installed).

Figure 4:
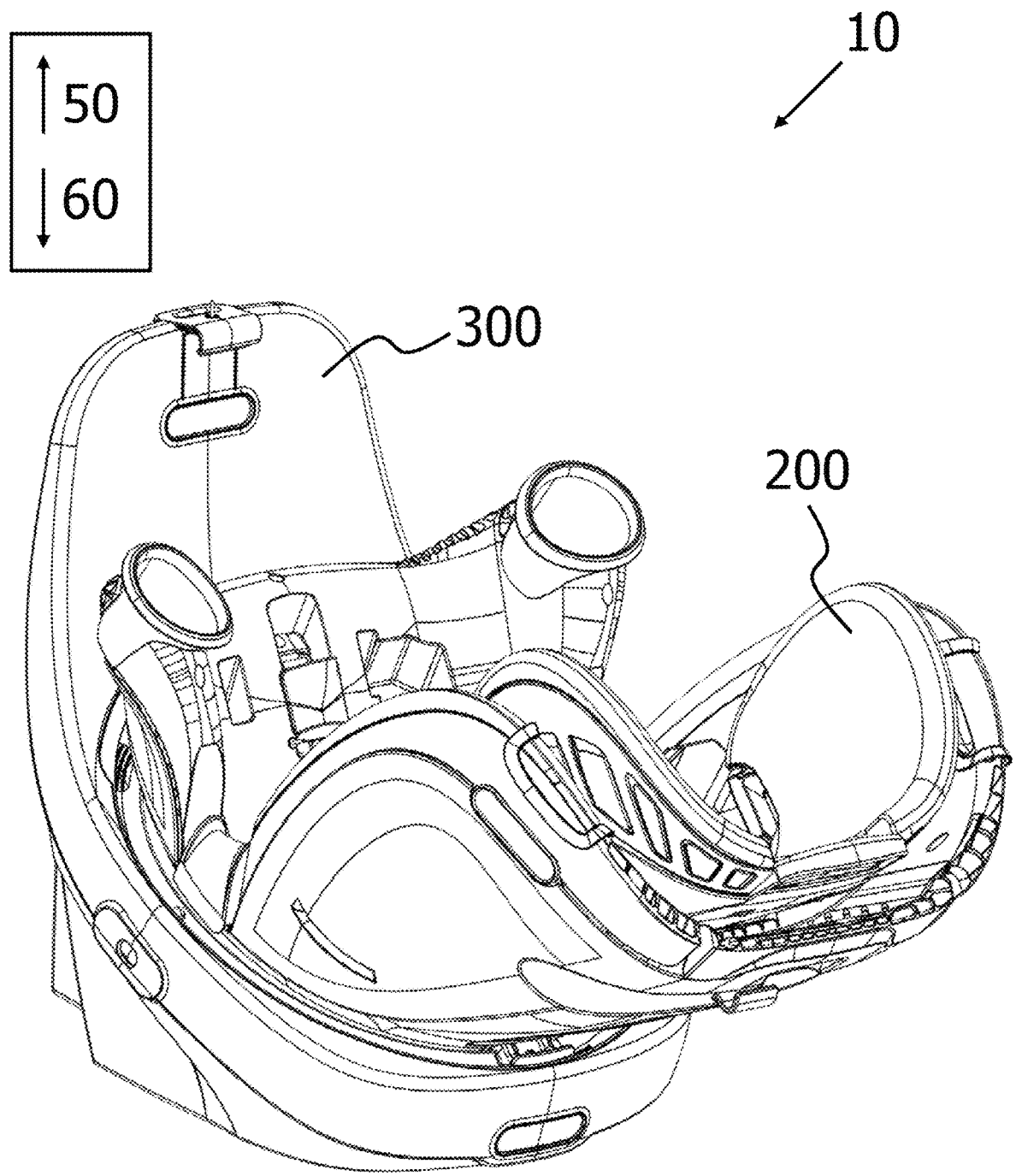
FIG. 4 is a perspective view of the car seat of FIG. 1 in a rearward-facing position.
Figure 5:
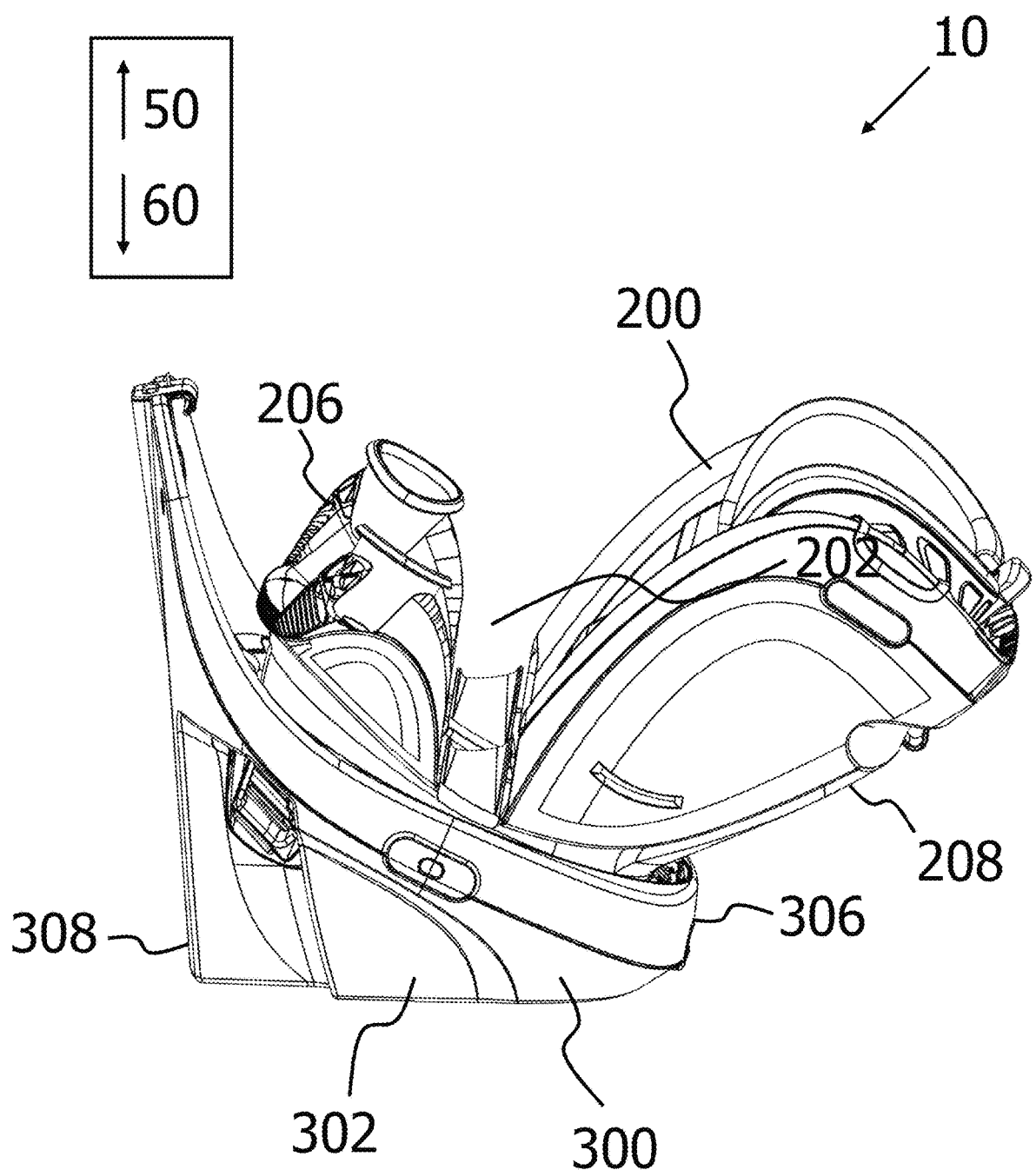
FIG. 5 is a side view of the car seat of FIG. 1 in the rearward-facing position.

FIG. 4 and FIG. 5 depict the seat shell 200 supported on the base 300 in a rearward-facing position. As can be readily understood with reference back to FIG. 2 and FIG. 3, the seat shell 200 is rotated with respect to the base 300 about 180° between the forward-facing position (FIG. 2 and FIG. 3) and the rearward-facing position (FIG. 4 and FIG. 5). Put another way, the seat shell 200 generally faces one direction in the forward-facing position and an opposite direction in the rearward-facing position. With reference to FIG. 5, in the rearward-facing position, the rear end 208 of the seat shell 200 and the forward end 306 of the base 300 face a common direction (e.g., toward the forward end of the vehicle when installed), and the forward end 206 of the seat shell 200 and the rear end 308 of the base 300 face a common direction (e.g., toward the rear end of the vehicle when installed).

Figure 6:
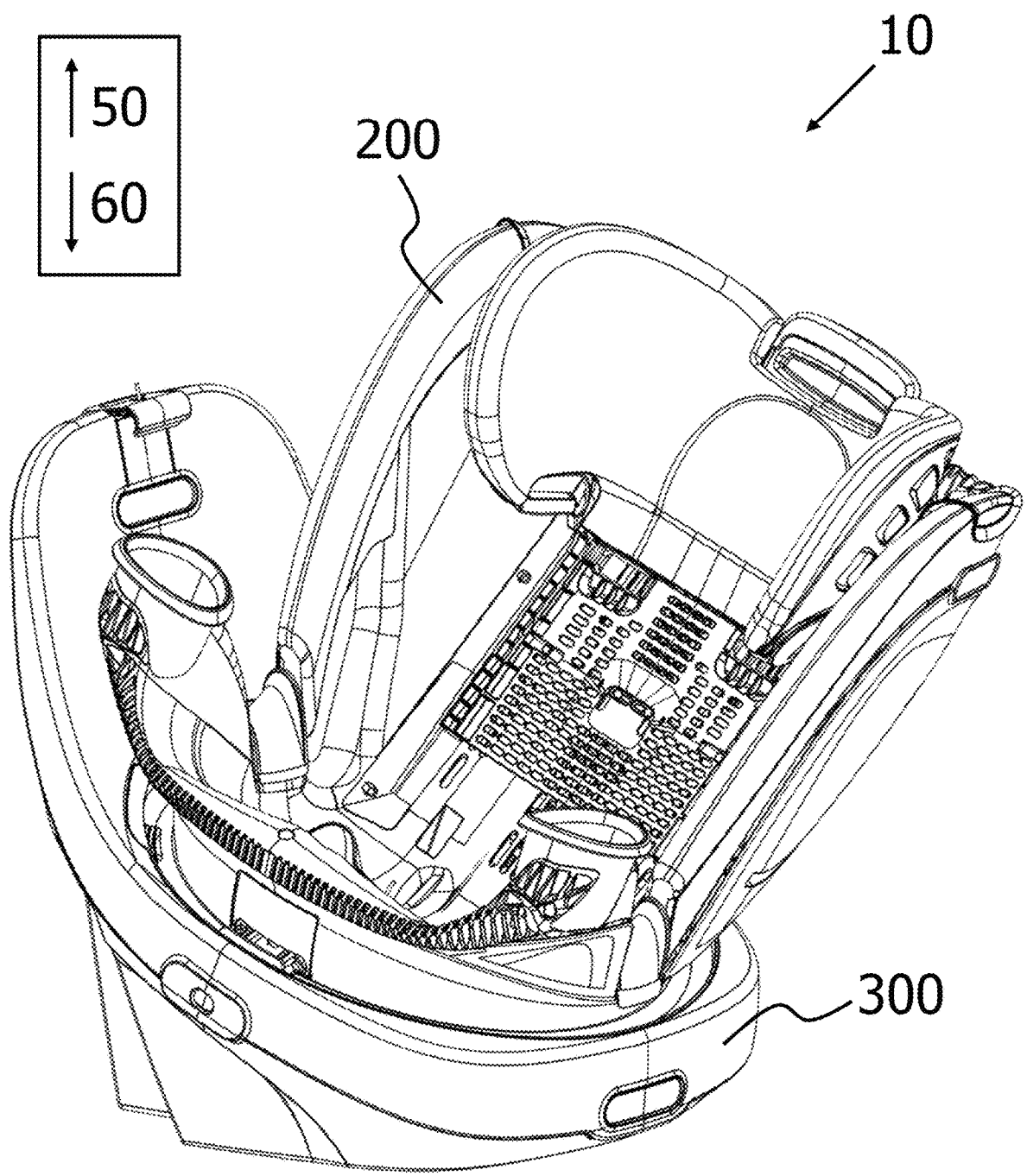
FIG. 6 is a perspective view of the car seat of FIG. 1 in an intermediate position.
Figure 7:
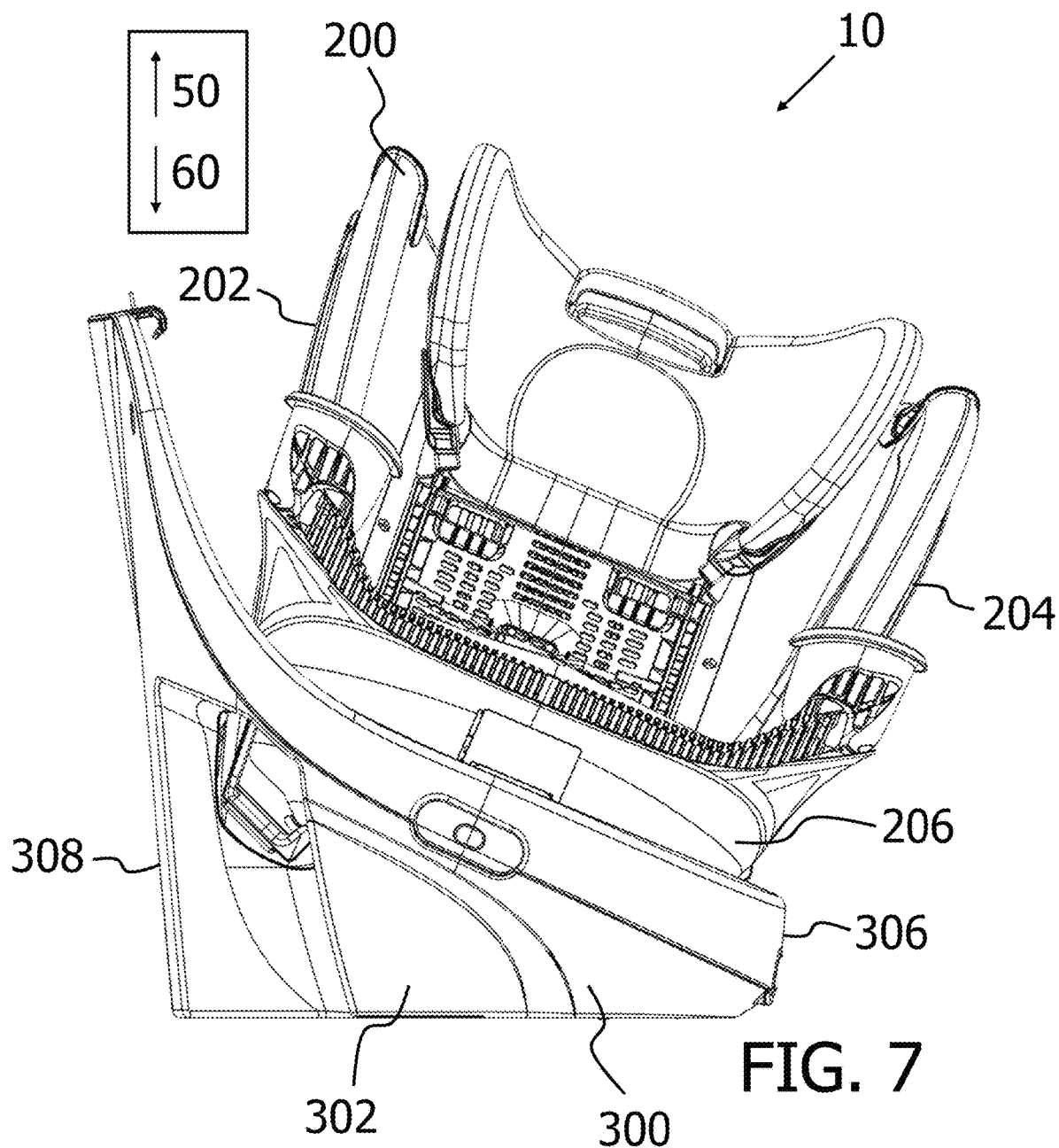
FIG. 7 is a side view of the car seat of FIG. 1 in the intermediate position.

FIG. 6 and FIG. 7 depict the seat shell 200 supported on the base 300 in an intermediate position. As can be readily understood with reference back to FIG. 2 and FIG. 3 and FIG. 4 and FIG. 5, the seat shell 200 is rotated with respect to the base 300 about 90° between either the forward-facing position (FIG. 2 and FIG. 3) or the rearward-facing position (FIG. 4 and FIG. 5) and the intermediate position (FIG. 6 and FIG. 7). Put another way, the seat shell 200 generally faces one direction in the forward-facing position, an opposite direction in the rearward-facing position, and a direction in between when in the intermediate position. With reference to FIG. 7, in the intermediate position, the forward end 206 of the seat shell 200 faces a direction between the forward end 306 of the base 300 and the rear end 308 of the base 300 (e.g., such that, when installed, the forward end 306 of the seat shell is toward a side door between the forward and rear ends of the vehicle), and the rear end 208 of the seat shell 200 faces a direction between the forward end 306 of the base 300 and the rear end 308 of the base 300 (e.g., such that, when installed, the rear end 308 of the seat shell is away from the side door between the forward and rear ends of the vehicle when installed).

As may now be appreciated, the seat shell 200 may generally be rotated with respect to the base 300 between the forward-facing position and the rearward-facing position as the base 300 remains installed and stationary in the vehicle. Further yet, the seat shell 200 may generally be rotated any desired amount with respect to the base 300 (including being rotated a full 360°. As may further be appreciated, the seat shell 200 is rotatable with respect to the base 300 to a variety of intermediate positions between the forward-facing position and the rearward-facing position. In this regard, it is specifically contemplated that the seat shell 200 may be rotatable with respect to the base 300 about 90° in both a clockwise direction and a counterclockwise direction to intermediate positions. In this way, the car seat 10 is adapted to be usable on either the driver's side or passenger's side of a vehicle and equally provides ease for a user to place a child into the car seat from a side door of the vehicle with the seat shell 200 generally facing the user. For example, in the intermediate position illustrated in FIG. 6 and FIG. 7, the seat shell 200 generally faces the passenger's side door of the vehicle and advantageously enables the user to quickly and easily place or remove a child from the car seat while facing the child.

FIGS. 8-13 illustrate various views of the base 300. Very generally, the base 300 may support and stabilize the seat shell 200. The base 300 may include a first side 302 and a second side 304 opposite the first side 302. The base 300 may further include a forward end 306 and a rear end 308 opposite the forward end 306.

In particular, the base 300 may include a receiving portion 310 and a backing portion 350. The receiving portion 310 of the base 300 may generally operate to support the seat shell 200 for rotation with respect thereto. For example, at least a portion of the seat shell 200 may be received by and/or within the receiving portion 310 of the base 300. Put another way, the receiving portion 310 of the base 300 may be configured to interface with at least a portion of the seat shell 200. As can be best seen in FIGS. 8-10, the backing portion 350 may extend upwardly away (i.e., in the direction of arrow 50) from the receiving portion 310, such as extending upwardly from the receiving portion 310 proximate the rear end 308 of the base 300.

Figure 8:
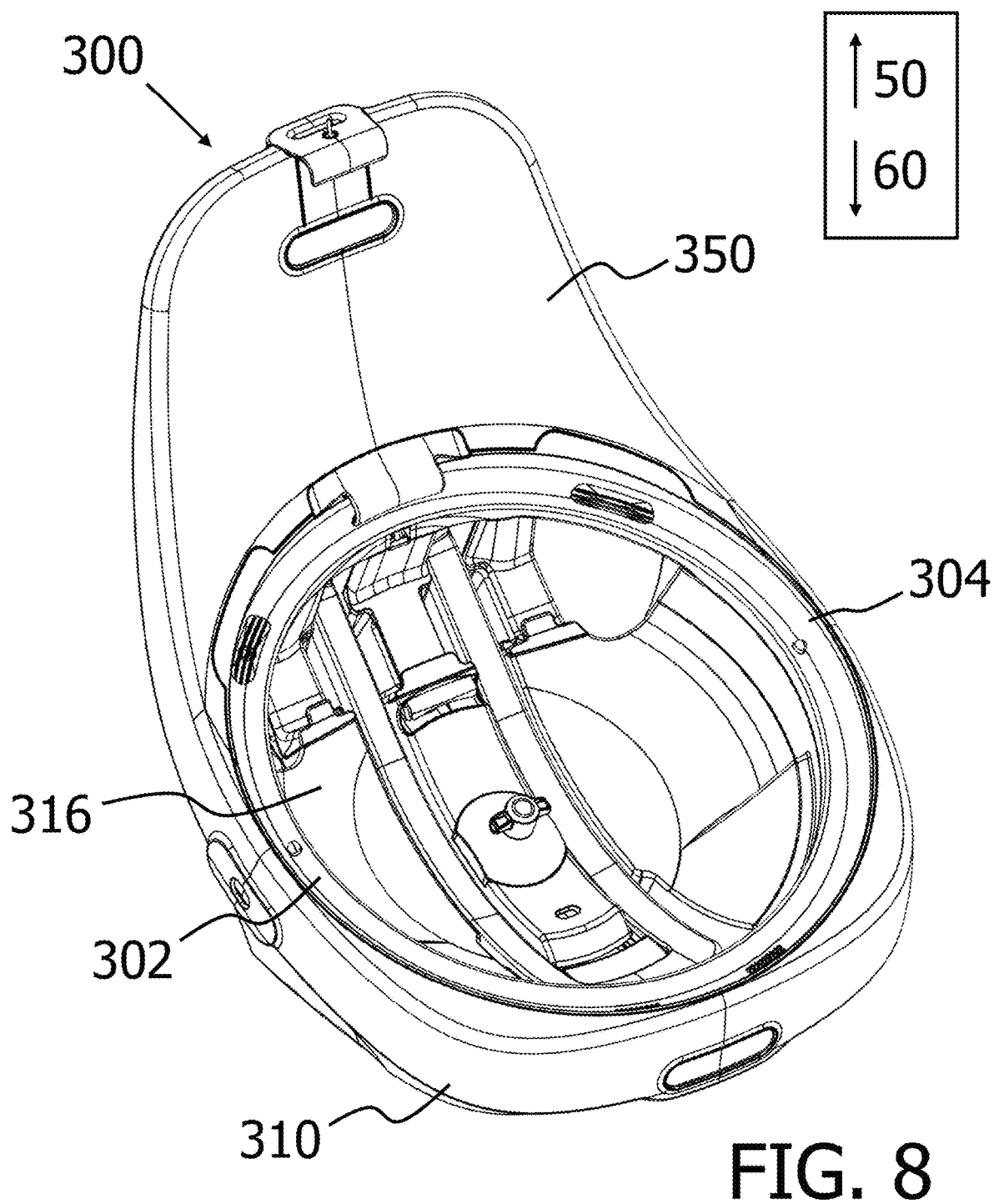
FIG. 8 is a perspective view of the base of the car seat of FIG. 1.

With particular reference to FIG. 8, in this exemplary embodiment, the receiving portion 310 of the base 300 is curved or concave so as to at least partially define a bowl shape. In this way, the receiving portion 310 of the base 300 generally defines a cavity 316 that is sized and shaped to receive at least a portion of the seat shell 200.

As described in detail herein, the base 300 is configured to lock rotation of the seat shell 200 with respect to the base 300. In particular, the base 300 is configured to lock rotation of the seat shell 200 with respect to the base 300 in each of the forward-facing position (refer to FIG. 2 and FIG. 3) and the rearward-facing position (refer to FIG. 4 and FIG. 5).

Figure 9A:
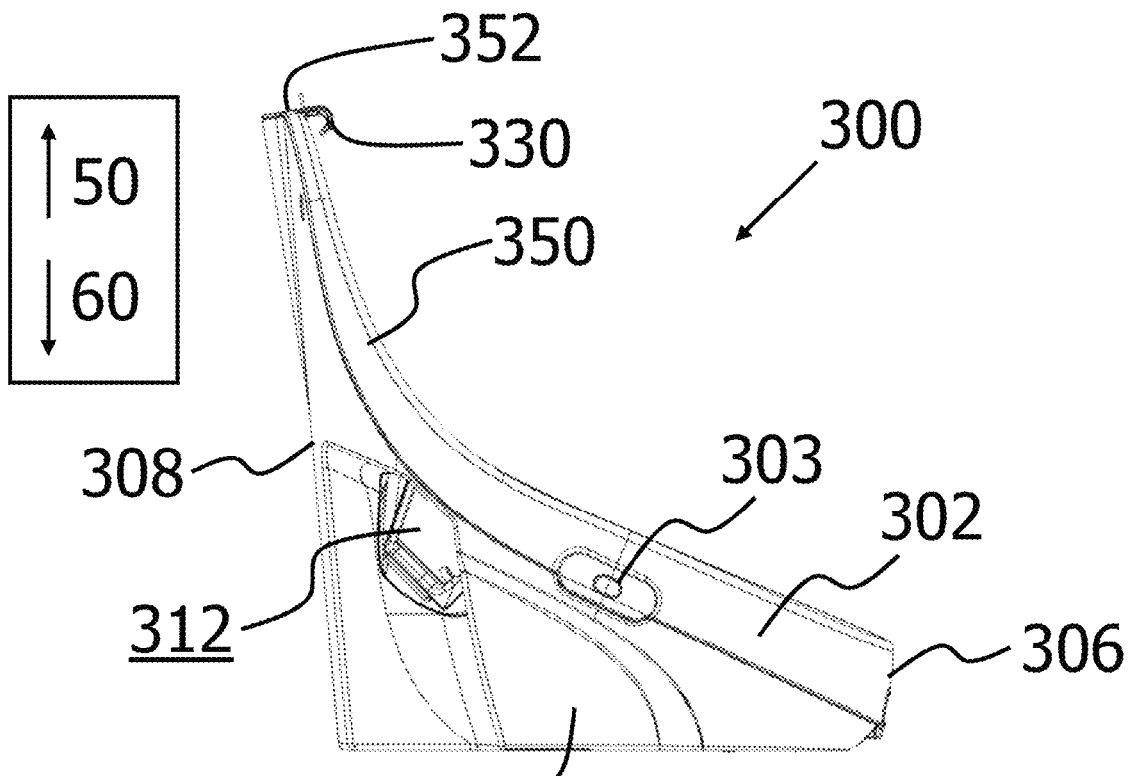
FIG. 9A is a first side view of the base of FIG. 8.
Figure 9B:
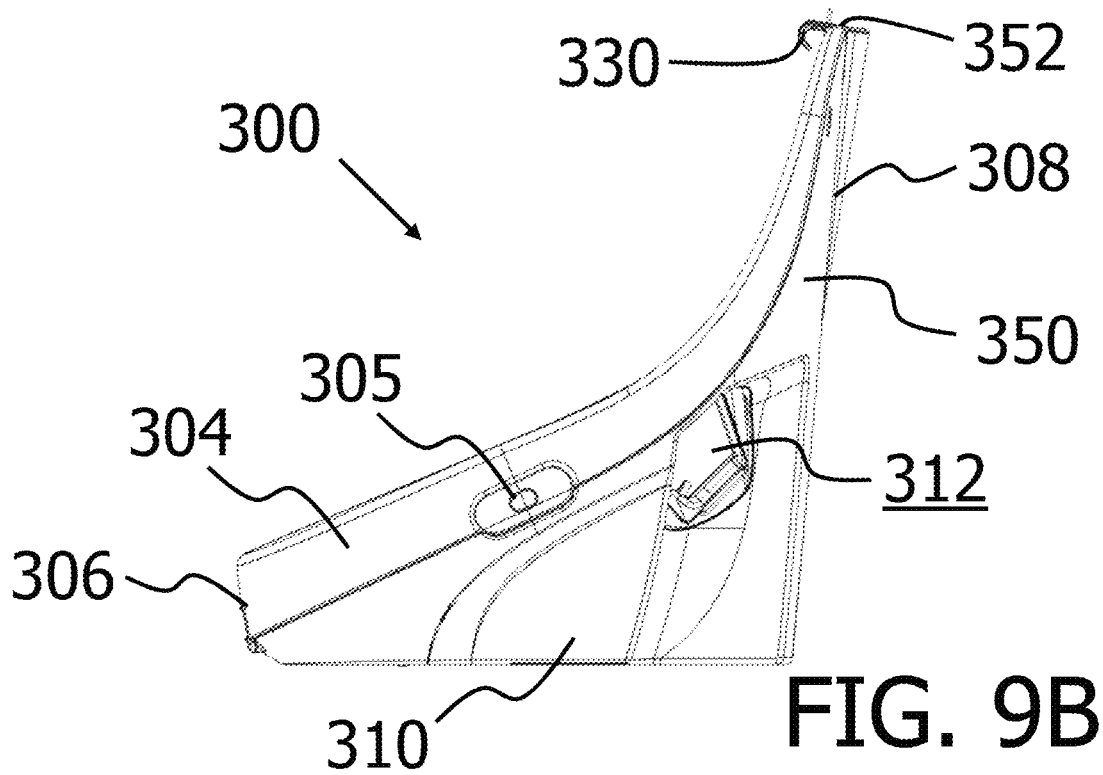
FIG. 9B is a second side view of the base of FIG. 8.
Figure 10:
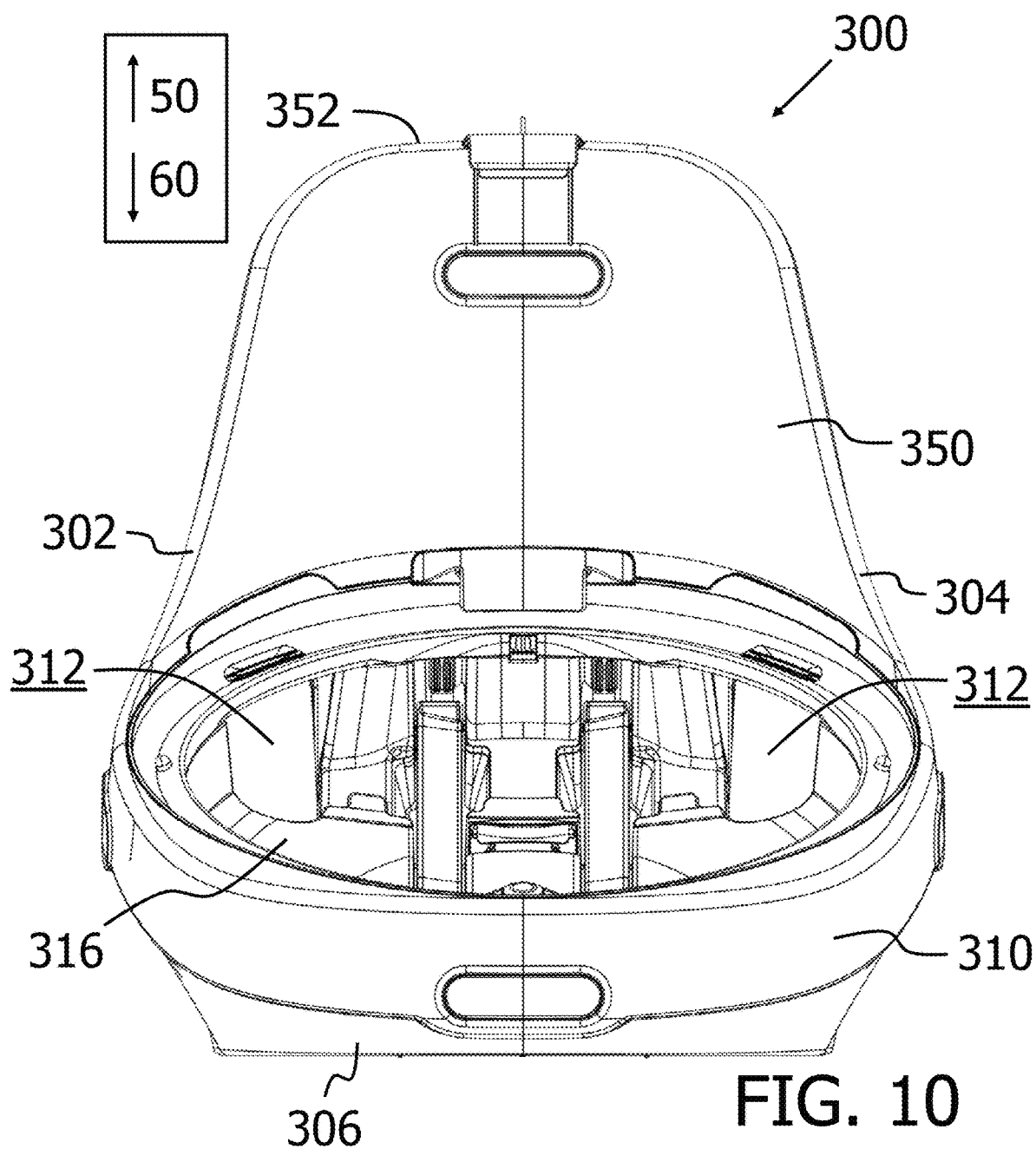
FIG. 10 is a front view of the base of FIG. 8.
Figure 11:
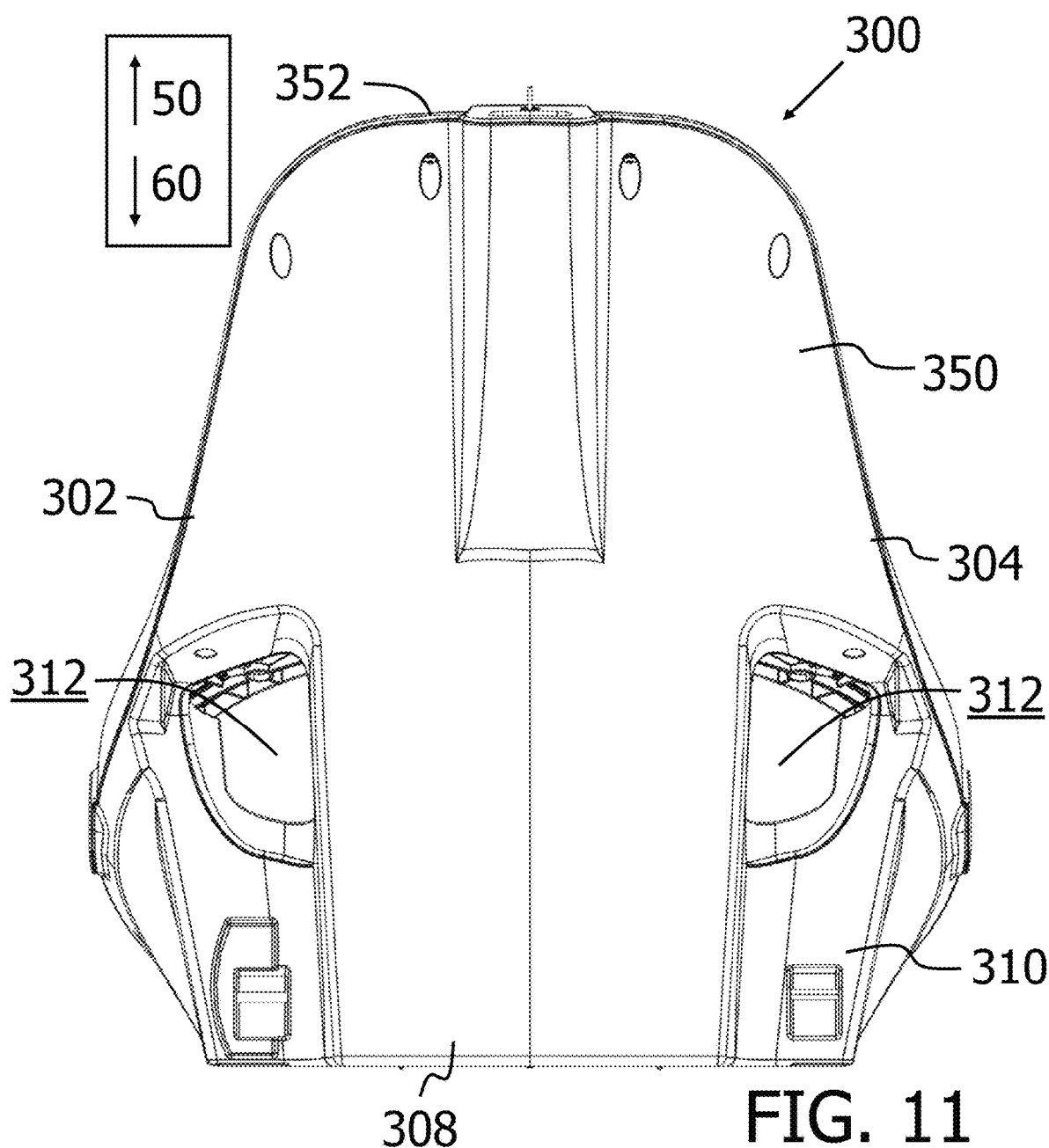
FIG. 11 is a rear view of the base of FIG. 8.

In certain constructions, the base 300 may include one or more indicators configured to indicate whether rotation of the seat shell 200 is locked with respect to the base 300. As best seen in FIG. 9A, a first indicator 303 may be positioned on the first side 302 of the base 300. Similarly, as best seen in FIG. 9B, a second indicator 305 may be positioned on the opposite, second side 304 of the base 300. Each of the first and second indicators 303, 305 may be configured to indicate whether rotation of the seat shell 200 is locked with respect to the base 300 (e.g., particularly to indicate whether rotation of the seat shell 200 is locked in the forward-facing position or the rearward-facing position). In particular, the first and second indicators 303, 305 may be configured to visibly indicate whether rotation of the seat shell 200 is locked with respect to the base 300. By way of non-limiting example, the first and second indicators 303, 305 may be configured to give a visual indication in a first color (e.g., red) when rotation of the seat shell 200 is unlocked with respect to the base 300 and/or when the seat shell 200 is not in the forward-facing position or the rearward-facing position, and the first and second indicators 303, 305 may be configured to give a visual indication in a second, different color (e.g., green) when rotation of the seat shell 200 is locked with respect to the base 300 and/or when the seat shell 200 is in the forward-facing position or the rearward-facing position.

With continued reference to FIG. 9A and FIG. 9B, the base 300 may include a belt path 312. The belt path 312 may be configured to receive a tether therealong (e.g., along a length of the base 300). In some embodiments, the tether can be an existing safety belt of a vehicle. In other embodiments, the tether can be any other form of tether (e.g., a tether provided with the car seat, a lower anchor system). The belt path 312 may generally extend across the base 300. For example, it can be seen in FIGS. 9-11 that the belt path 12 generally extends from the first side 302 of the base 300 to the second side 304 of the base 300. With specific comparison between FIG. 3 (depicting the seat shell 200 supported on the base 300 in the forward-facing position) and FIG. 9A, it can be seen that the belt path 312 is positioned above and rearward of a lower portion 210 of the seat shell 200. This advantageously allows the seat shell 200 to be rotated and/or reclined with respect to the base 300 without interfering with the belt path 312 and without any need to uninstall the base 300 or otherwise reroute or reposition the tether when it is desired to rotate the seat shell 200 with respect to the base 300. In addition, the seat shell 200 is readily removable or detachable from the base 300 without any need to uninstall or reinstall the base 300 or otherwise reroute or reposition the tether.

Figure 12:
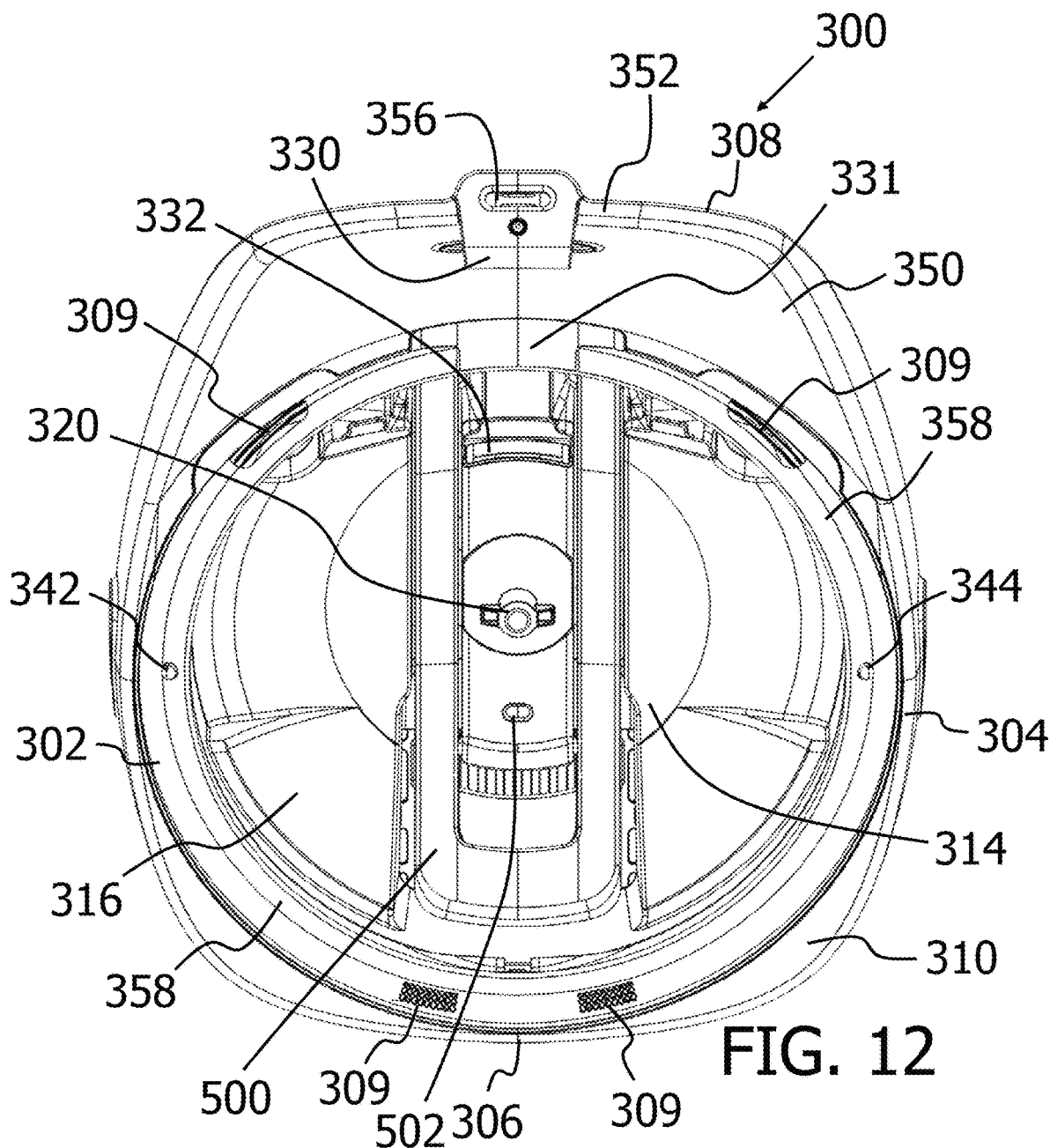
FIG. 12 is a top view of the base of FIG. 8.

With reference now to FIG. 12, the backing portion 350 of the base 300 may include an upper tethering point 356. The upper tethering point 356 is generally designed to operate as a tether anchor. The upper tethering point 356 may be positioned proximate an upper edge 352 of the backing portion 350 of the base 300. The upper tethering point 356 may be configured to remain stationary as the seat shell 200 is rotated with respect to the base 300. This advantageously allows the seat shell 200 to be rotated and/or reclined with respect to the base 300 without interfering with the upper tethering point 356 and without any need to uninstall the base 300 or otherwise reroute or reposition a tether attached to the upper tethering point 356 when it is desired to rotate the seat shell 200 with respect to the base 300. In addition, the seat shell 200 is readily removable or detachable from the base 300 without any need to uninstall or reinstall the base 300 or otherwise reroute or reposition a tether attached to the upper tethering point 356. As such, the car seat may advantageously remain constantly anchored via the upper tethering point 356 without interfering with rotation and/or reclination of the seat shell 200 with respect to the base 300.

Figure 13:
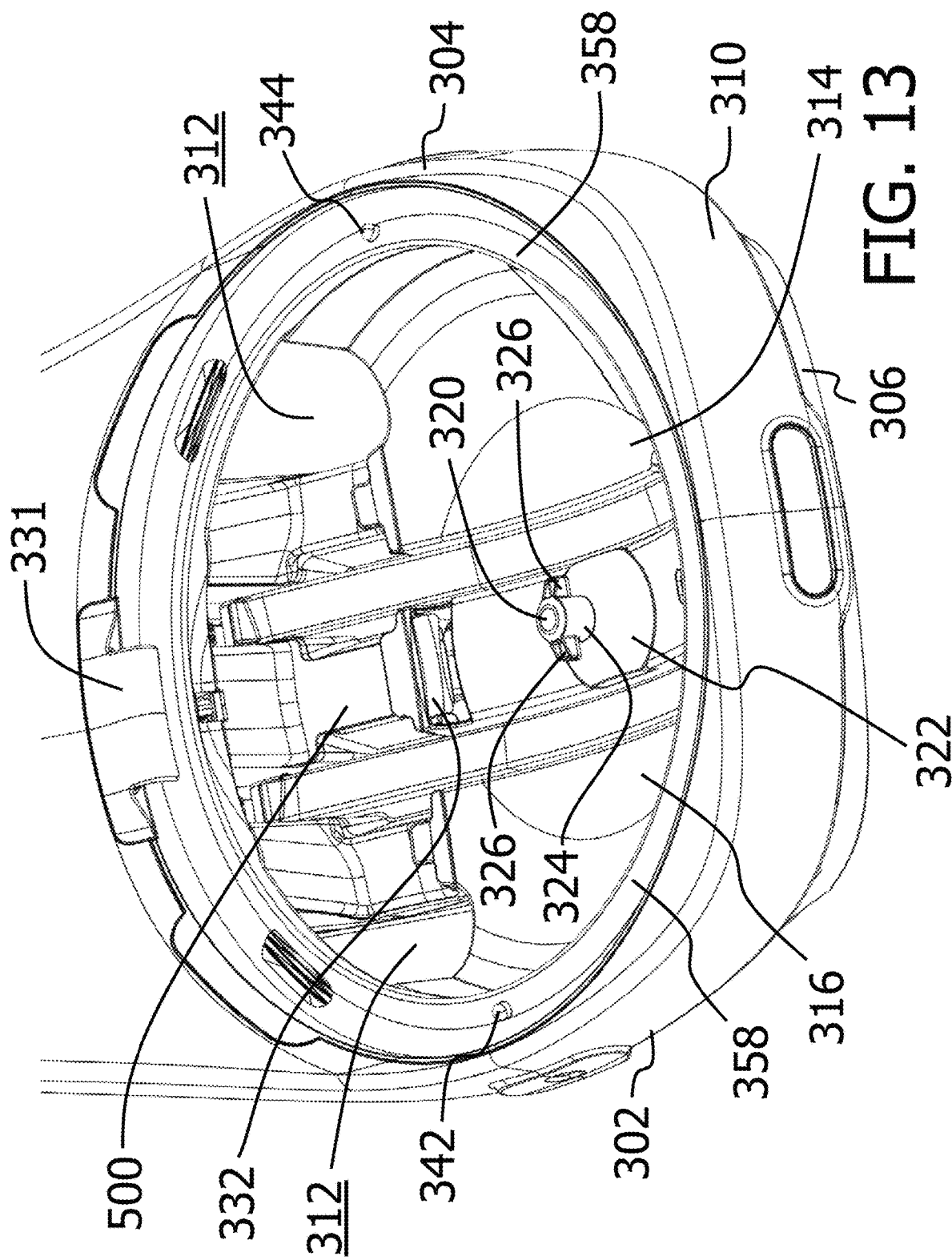
FIG. 13 is a perspective view of the receiving portion of the base of FIG. 8.

With continued reference to FIG. 12, the cavity 316 of the receiving portion 310 of the base 300 can be more clearly seen. The cavity 316 generally has an open or missing top face and is at least partially defined and bound by an inner surface 314 of the receiving portion 310 of the base 300. As can be seen in FIG. 12 and FIG. 13, the receiving portion 310 of the base 300 may include a projection 320. The projection 320 may extend upwardly away from the inner surface 314 of the receiving portion 310 of the base 300, such as extending upwardly from the inner surface 314 of the receiving portion 310 proximate a midpoint between the first side 302 and the second side 304 of the base 300. That is, the projection 320 may be positioned substantially centrally between the first side 302 and the second side 304 of the base 300. As can be seen in FIG. 12, the projection 320 may generally be positioned closer to the rear end 308 of the base 300 than the front end 306 of the base 300. As can be further seen in FIG. 12, the projection 320 may generally be angled toward the front end 306 of the base 300. The angling of the projection 320 may help ensure that as the seat shell 200 is rotated with respect to the base 300, the seat shell 200 remains engaged with and correctly angled (i.e., reclined) with respect to the base 300, including in both the rearward-facing and forward-facing positions.

The receiving portion 310 of the base 300 may include a support ledge 358. The support ledge 358 may generally operate as a surface along which at least a portion of the seat shell 200 travels as the seat shell 200 is rotated with respect to the base 300, as described in detail herein. The support ledge 358 may be positioned radially inward of an outer edge of the receiving portion 310 of the base 300. As seen in FIG. 12 and FIG. 13, the support ledge 358 may generally be circular in shape and define an opening to the cavity 316 of the receiving portion 310 of the base 300.

The receiving portion 310 of the base 300 may include one or more retainment features. For example, as shown in FIG. 12 and FIG. 13, a first retainment feature 342 may be positioned on the first side 302 of the base 300. A second retainment feature 344 may be positioned on the opposite, second side 304 of the base 300. As best seen in FIG. 12 and FIG. 13, the first and second retainment features 342, 344 may me positioned on the support ledge 358. The first and second retainment features 342, 344 of the base 300 generally operate so as to retain the seat shell 200 in the intermediate position (refer to FIG. 6 and FIG. 7). More specifically, as described in detail herein, each of the first and second retainment features 342, 344 may be configured to engage at least a portion of the seat shell 200 to retain the seat shell 200 in the intermediate position. By way of non-limiting example, the first and second retainment features 342, 344 may be formed as nubs or projections. Alternatively, the seat shell 200 could be formed with corresponding nubs or projections and the first and second retainment features 342, 344 could be formed as detents or apertures configured to engage with the corresponding nubs or projections of the seat shell 200.

With continued reference to FIG. 12, the base 300 may include one or more receiving features. For example, as shown in FIG. 12 and FIG. 13, an upper receiving feature 330 may be positioned on the backing portion 350 of the base 300. More specifically, the upper receiving feature 330 may be positioned on the backing portion 350 of the base 300 proximate the upper edge 352 of the backing portion 350 of the base 300. By way of non-limiting example, as may be best seen with reference back to FIG. 8 and FIGS. 9A-B, the upper receiving feature 330 may be formed as a hook. In particular, the upper receiving feature 330 may be formed as a downward-pointing or downward-oriented hook (i.e., in the direction of arrow 60 in FIG. 8 and FIGS. 9A-B). In certain constructions and as best seen in FIG. 12, the upper receiving feature 330 may also define the upper tethering point 356.

As shown in FIG. 12 and FIG. 13, an intermediate receiving feature 331 may be positioned proximate the rear end 308 of the base 300. In particular, the intermediate receiving feature 331 may be positioned proximate a location where the backing portion 350 of the base 300 meets the receiving portion 310 of the base 300. More specifically, the intermediate receiving feature 331 may be positioned proximate the support ledge 358 of the receiving portion 310 of the base 300. By way of non-limiting example, the intermediate receiving feature 331 may be formed as a hook. In particular, the intermediate receiving feature 331 may be formed as a downward-pointing or downward-oriented hook.

With continued reference to FIG. 12 and FIG. 13, a lower receiving feature 332 may be positioned within the receiving portion 310 of the base 300. In particular, the lower receiving feature 332 may be positioned within the receiving portion 310 of the base 300 proximate the rear end 308 of the base 300. More specifically, the lower receiving feature 332 may be positioned within the receiving portion 310 of the base 300 on one side of the belt path 312. By way of non-limiting example, the lower receiving feature 332 may be formed as a hook. In particular, the lower receiving feature 332 may be formed as a downward-pointing or downward-oriented hook.

The upper, intermediate, and lower receiving features 330, 331, 332 of the base 300 generally operate so as to retain the seat shell 200 in the forward-facing position (refer to FIG. 2 and FIG. 3) or the rearward-facing position (refer to FIG. 4 and FIG. 5). More specifically, as described in detail herein, each of the upper, intermediate, and lower receiving features 330, 331, 332 may be configured to engage at least a portion of the seat shell 200 to retain the seat shell 200 in the forward-facing position or the rearward-facing position.

As can be best seen in the exemplary embodiment illustrated in FIG. 12, the base 300 may include a belt lock off arm 500. The belt lock off arm 500 can be connected to the base 300. A proximal end of belt lock off arm 500 may be connected to the base 300 on one side of the belt path 312. In particular, as shown in FIG. 12, the belt lock off arm 500 may be connected to the base 300 proximate the rear end 308 of the base 300. In this way, the belt lock off arm 500 may be configured to extend across the belt path 312. A distal end of the belt lock off arm 500 may be spaced apart from the proximal end of the belt lock off arm 500. The belt lock off arm 500 may be pivotally movable with respect to the base 300 such that the distal end of the belt lock off arm 500 is capable of moving toward and away from the base 300 (and, more particularly, toward and away from the belt path 312) between a locked position and an unlocked position. In certain non-depicted embodiments, the belt lock off arm 500 may also be slidably movable with respect to the base 300 such that the belt lock off arm 500 is slidable into and out of the base 300. The belt lock off arm 500 may be slidable into and out of the base 300 in a direction substantially perpendicular to the belt path 312.

The belt lock off arm 500 may generally operate so as to engage with (e.g., clamp, tension) a tether extending along the belt path 312 in a locked position (e.g., as shown in FIG. 12). In embodiments, the belt lock off arm 500 is configured to clamp the tether. In other embodiments, the belt lock off arm 500 is configured to tension the tether. In further embodiments, the belt lock off arm 500 is configured to clamp and tension the tether. More specifically, the belt lock off arm 500 may be movable between (a) an unlocked position in which the belt lock off arm 500 is not configured to engage (e.g., clamp and/or tension) the tether of the associated vehicle, and (b) a locked position in which the belt lock off arm 500 is configured to engage (e.g., clamp and/or tension) the tether of the associated vehicle. As will be appreciated by those skilled in the art, the belt lock off arm 500 may increase the mechanical advantage in the system by using leverage to assist in clamping and/or tensioning the tether. This advantageously decreases the amount of force a user would otherwise be required to apply to clamp and/or tension the tether and likewise advantageously decreases the potential for an improper, unsafe, or otherwise undesirable installation.

In certain constructions, the belt lock off arm 500 may include one or more indicators configured to indicate whether the belt lock off arm 500 is in the locked position. As best seen in FIG. 12, an indicator 502 may be positioned on an upper face of the belt lock off arm 500. The indicator 502 may be configured to indicate the belt lock off arm 500 is in the locked position in which the belt lock off arm 500 is configured to engage (e.g., clamp and/or tension) the tether of the associated vehicle. In particular, the indicator 502 may be configured to visibly indicate whether the belt lock off arm 500 is in the locked position. By way of non-limiting example, the indicator 502 may be configured to give a visual indication in a first color (e.g., red) when the belt lock off arm 500 is in the unlocked position and another visual indication in a second, different color (e.g., green) when the belt lock off arm 500 is in the locked position.

As can be best seen in FIG. 13, the belt lock off arm 500 may be designed to be generally U-shaped, although embodiments of the present disclosure are not so limited and the belt lock off arm 500 may be of any suitable size and shape. In this regard, when the belt lock off arm 500 is in the locked position (refer to FIG. 12 and FIG. 13), the belt lock off arm 500 may lie about (e.g., around) the projection 320. More specifically, in certain constructions, the belt lock off arm 500 may lie within a recessed portion in the inner surface 314 of the receiving portion of the base 300. In this way, the projection 320 may extend upwardly away from the inner surface 314 of the receiving portion of the base 300 above the belt lock off arm 500, such that the belt lock off arm 500 does not interfere with rotation and/or reclination of the seat shell 200 with respect to the base 300 as described in detail herein. Additionally, in the locked position, the belt lock off arm 500 may lie about the lower receiving feature 332.

As can be best seen in the exemplary embodiment illustrated in FIG. 13, the projection 320 may include a pedestal 322. The pedestal 322 of the projection 320 may extend upwardly from the inner surface 314 of the receiving portion 310 of the base 310. In this way, the pedestal 322 of the projection 320 may be shaped so as to at least partially define a cone shape (i.e., by tapering inwardly in diameter as the pedestal 322 of the projection 320 extends away from the inner surface 314 of the receiving portion 310 of the base 310). In this way, the pedestal 322 of the projection 320 may generally extend upwardly away from the inner surface 314 of the receiving portion 310 of the base 300. As a result, any debris that has collected between the seat shell 200 and the base 300 may generally be prevented from interfering with the interface between the seat shell 200 and the base 300. In this way, any debris that accumulates between seat shell 200 and the base 300 may be prevented or retarded from substantially encumbering rotation of the seat shell 200 with respect to the base 300. The projection 320 may further include a post 324. The post 324 of the projection 320 may extend upwardly from the pedestal 322 of the projection 320. The projection 320 may further include one or more flanges 326. In the exemplary embodiment illustrated in FIG. 13, the projection 320 includes a plurality of flanges 326. The flanges 326 of the projection 320 may be spaced apart from one another about the post 324 of the projection 320. The flanges 326 of the projection 320 may extend outwardly away from the post 324 of the projection 320. In certain constructions, the flanges 326 of the projection 320 may extend outwardly away from the post 324 of the projection 320 on opposite sides of the post 324. In particular embodiments, a first one of the flanges 326 of the projection 320 may extend outwardly away from the post 324 of the projection 320 toward the first side 302 of the base 300, and a second one of the flanges 326 of the projection 320 may extend outwardly away from the post 324 of the projection 320 toward the second side 304 of the base 300. The flanges 326 of the projection 320 may be spaced apart from the pedestal 322 of the projection 320.

FIGS. 14-20 illustrate various views of the seat shell 200. Very generally, the seat shell 200 may support and stabilize an occupant (e.g., an infant or child) therein and/or thereon. The seat shell 200 may include a first side 202 and a second side 204 opposite the first side 202. The seat shell 200 may further include a forward end 206 and a rear end 208 opposite the forward end 206. As described in detail herein, the seat shell 200 may be supported on the base 300, and the seat shell 200 may be rotatable with respect to the base 300 such that the seat shell 200 is selectively positionable in a variety of different positions (e.g., a rearward-facing position, a forward-facing position, an intermediate loading position). In particular, the seat shell 200 is selectively positionable in at least a forward-facing position (refer to FIG. 2 and FIG. 3) and a rearward-facing position (refer to FIG. 4 and FIG. 5). As described in detail herein, the seat shell 200 may also be removably attached to the base 300.

In particular, the seat shell 200 may include a seat bottom 209, a seat back 250, and a lower portion 210. The seat bottom 209 of the seat shell 200 may generally operate as a seating surface for the occupant by supporting and stabilizing the butt of the occupant. For example, an occupant may be seated upon a top surface of the seat bottom 209 of the shell. As can be best seen in FIG. 14 and FIGS. 15A-B, the seat back 250 may extend upwardly away (i.e., in the direction of arrow 50) from the seat bottom 209, such as extending upwardly from the seat portion 209 proximate the rear end 208 of the seat shell 200. The seat bottom 209 may interface with the receiving portion 310 of the base.

The seat shell 200 may include a lower portion 210. The lower portion 210 may, in certain embodiments, be part of the seat bottom 209 and may be integrally formed therewith. As described in detail herein, the lower portion 210 may interface with the receiving portion 310 of the base 300. As described in detail herein, the receiving portion 310 of the base 300 may generally operate to support the seat shell 200 for rotation with respect thereto. For example, the lower portion 210 of the seat shell 200 may be received by and/or within the receiving portion 310 of the base 300. Put another way, the lower portion 210 of the seat shell 200 may be configured to interface with the receiving portion 310 of the base 300. In particular, the cavity 316 of the receiving portion 310 of the base 300 may receive the lower portion 210 of the seat shell 200.

With particular reference to FIG. 9A and FIG. 9B, in this exemplary embodiment, the lower portion 210 of the seat shell 200 is curved or convex so as to at least partially define a dome shape. In this way, the lower portion 210 of the seat shell 200 may be shaped complementary to the concave, bowl-shaped receiving portion 310 of the base 300. Advantageously, the complementary shapes of the lower portion 210 of the seat shell 200 and the receiving portion 310 of the base 300 assists in retarding the ability for debris to enter between the seat shell 200 and the base 300 as the seat shell 200 is rotated with respect to the base 300. Constructing the car seat 10 such that debris is retarded from entering between the seat shell 200 and the base 300 (e.g., such that minimal or no debris gaps are defined between the seat shell 200 and the base 300) ensures that rotation of the seat shell 200 with respect to the base 300 can occur substantially unencumbered and without being substantially impeded or retarded by debris that could otherwise accumulate between the seat shell 200 and the base 300. To assist in preventing debris from entering the receiving portion 310 of the base 300 and/or removing debris, the base 300 may include one or more openings or sets of openings 309. In certain embodiments, such openings 309 may be defined in the support ledge 358 and/or proximate the support ledge 358, as can be best seen in FIG. 12. In other, non-depicted embodiments, the base 300 may include one or more other mechanisms (e.g., wipers) configured to assist in the removal of debris from the receiving portion 310 of the base 300, namely any debris that has accumulated near the projection 320.

As described in detail herein, the base 300 is configured to lock rotation of the seat shell 200 with respect to the base 300. In particular, the base 300 is configured to lock rotation of the seat shell 200 with respect to the base 300 in each of the forward-facing position (refer to FIG. 2 and FIG. 3) and the rearward-facing position (refer to FIG. 4 and FIG. 5).

Figures 15A, 15B:
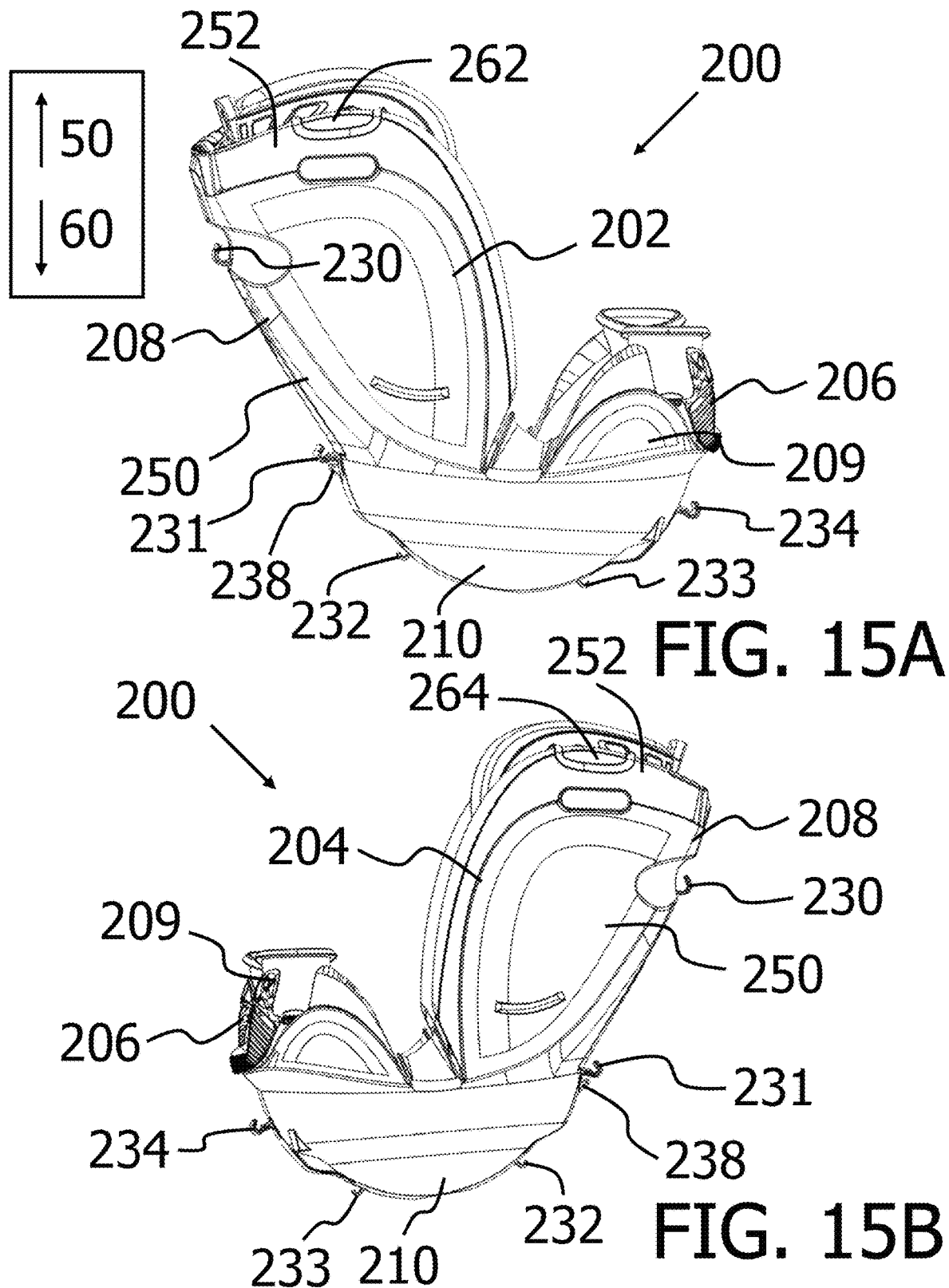
FIG. 15A is a first side view of the seat shell of FIG. 14.
FIG. 15B is a second side view of the seat shell of FIG. 14.

With reference now to FIG. 15A and FIG. 15B, the lower portion 210 of the seat shell 200 may include a locking projection 238. The locking projection 238 may extend outwardly away from the seat shell 200, such as extending outwardly away from the rear end 208 of the seat shell 200 proximate a location where the seat back 250 of the seat shell 200 meets the lower portion 210 of the seat shell 200.

Figure 18:
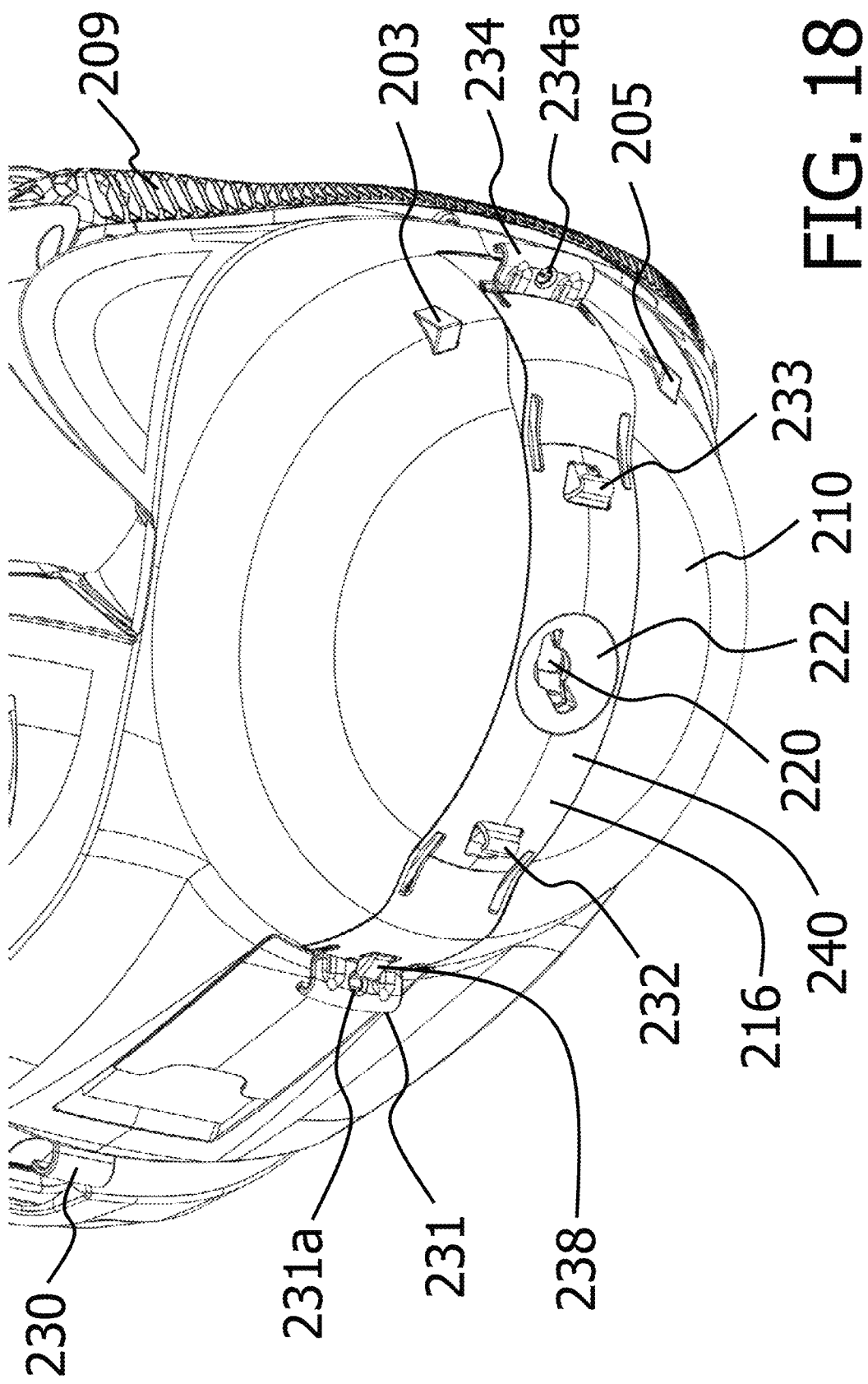
FIG. 18 is a perspective view of the lower portion of the seat shell of FIG. 14.

With reference to FIG. 18, the locking projection 238 may be positioned substantially centrally between the first side 202 and the second side 204 of the seat shell 200. As described in detail herein, the locking projection 238 may be configured to be deflectable or movable between a locked position and an unlocked position. The locking projection 238 may be configured to be deflectable or movable into the lower portion 210 of the seat shell 200. In particular, the locking projection 238 is configured to deflect or move into and out of engagement with the base 300 so as to selectively lock and unlock rotation of the seat shell 200 with respect to the base 300. More specifically, the locking projection 238 may be biased (e.g., spring-biased) outwardly into the locked position such that the locking projection 238 is configured to automatically lock rotation of the seat shell 200 with respect to the base 300 when the seat shell 200 is in the forward-facing position (refer to FIG. 2 and FIG. 3) or the rearward-facing position (refer to FIG. 4 and FIG. 5). The locking projection 238 is generally configured such that it does not lock rotation of the seat shell 200 with respect to the base 300 when the seat shell 200 is in the intermediate position (refer to FIG. 6 and FIG. 7).

With continued reference to FIGS. 15A-B and FIG. 16, the seat shell 200 may include one or more actuators or handles. In the exemplary embodiment illustrated in FIG. 15A and FIG. 15B, the seat shell 200 includes a first actuator or handle 262 positioned on the first side 202 of the seat shell 200 and a second actuator or handle 264 positioned on the opposite, second side 204 of the seat shell 200. More specifically, in this embodiment, the first and second handles 262, 264 are each positioned proximate an upper edge 252 of the seat back 250 of the seat shell 200. The first and second handles 262, 264 are each operatively connected to the locking projection 238. The first and second handles 262, 264 generally operate so as to deflect or move the locking projection 238 out of engagement with the base 300 so as to unlock rotation of the seat shell 200 with respect to the base 300. In particular, the first and second handles 262, 264 may be configured to independently move the locking projection 238 out of engagement with the base 300 so as to unlock rotation of the seat shell 200 with respect to the base 300. That is, in certain constructions, actuation of just one of the first or second handles 262, 264 is sufficient to overcome the biasing force acting upon the locking projection 238 and to move the locking projection 238 out of engagement with the base 300 so as to unlock rotation of the seat shell 200 with respect to the base 300. In this way, the car seat 10 is adapted to be usable on either the driver's side or passenger's side of a vehicle and equally provides ease for a user to actuate one of the first or second handles 262, 264 from a side door of the vehicle. For example, this advantageously enables the user to quickly and easily actuate one of the first or second handles 262, 264 without having to reach across the car seat or an occupant in the car seat.

As seen in FIG. 16, the car seat 10 may include an adjustable assembly 400. The adjustable assembly 400 may include at least a headrest member. The adjustable assembly 400 may be mounted for sliding movement relative to the seat shell 200. The adjustable assembly 400 may be selectively positionable with respect to the seat shell 200 (e.g., in a reclined headrest position). Additional features of the adjustable assembly are disclosed in co-pending U.S. patent application Ser. No. 15/837,231, entitled Adjustable Headrest for Child Car Seat, the subject matter of which is incorporated herein by reference.

Figure 17:
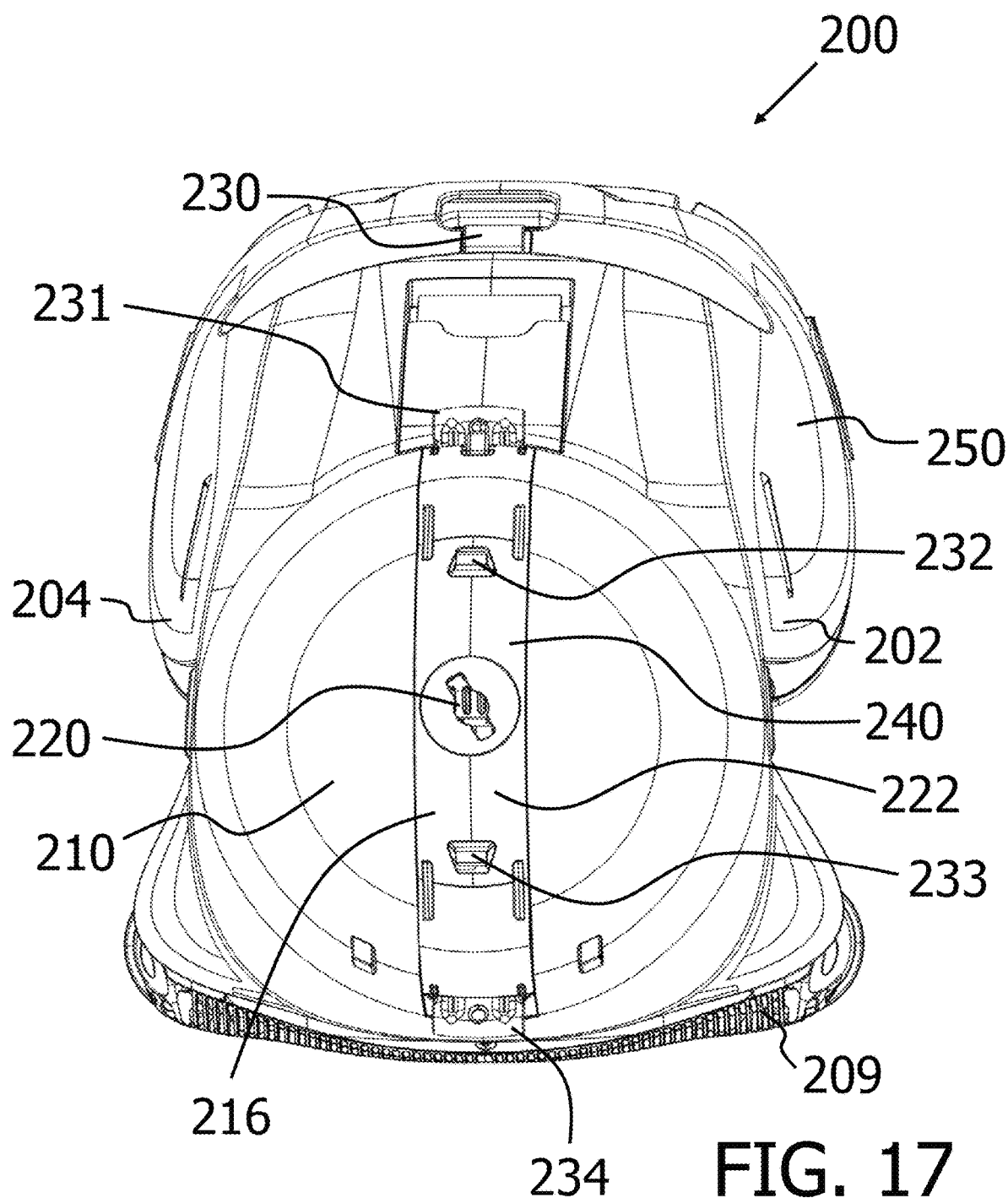
FIG. 17 is a bottom view of the seat shell of FIG. 14.

Turning now to FIG. 17 and FIG. 18, the lower portion 210 of the seat shell 200 may include an aperture 220. The aperture 220 may extend through the outer surface 216 of the lower portion 210 of the seat shell 200. The aperture 220 may be configured to receive at least a portion of the projection 320 of the base 300 therethrough. In this way, the lower portion 210 of the seat shell 200 may interface with the receiving portion 310 of the base 300, namely with the aperture 220 in the lower portion 210 of the seat shell 200 interfacing with the projection 320 in the receiving portion 310 of the base 300. As may now be appreciated, the base 300 may rotatably support the seat shell 200 with the outer surface 216 of the lower portion 210 of the seat shell 200 generally juxtaposed the inner surface 314 of the receiving portion 310 of the base 300. As may now be appreciated, the seat bottom 209 (namely the lower portion 210 thereof) of the seat shell 200 may interface with the receiving portion 310 of the base 300 via the aperture 220 in the lower portion 210 of the seat shell 200 interfacing with the projection 320 in the receiving portion 310 of the base 300. In alternative embodiments, it is contemplated that the interfacing structures of the seat bottom 209 of the seat shell 200 and the receiving portion 310 of the base 300 could be reversed. That is, it is specifically contemplated that in certain non-depicted embodiments, the receiving portion 310 of the base 300 could be formed with an aperture that interfaces with a projection of the seat bottom 209 of the seat shell 200.

As can be best seen in the exemplary embodiment illustrated in FIG. 17 and FIG. 18, the outer surface 216 of the lower portion 210 of the seat shell 200 may include a recessed portion 222. The recessed portion 222 may extend inwardly from the outer surface 216 of the lower portion 210 of the seat shell 200. As may be best seen in FIG. 18 with reference also to FIG. 13, the recessed portion 222 of the outer surface 216 of the lower portion 210 of the seat shell 200 may be shaped complementary to the pedestal 322 of the projection 320 of the base 300. In this way, the pedestal 322 of the projection 320 may be at least partially received within the recessed portion 222. Put another way, at least a portion of the pedestal 322 of the projection 320 may be received within the recessed portion 222. As a result, the seat shell 200 may be better supported and stabilized on the base 300. Furthermore, the specific shapes of the recessed portion 222 and the pedestal 322 of the projection 320 permit the seat shell 200 to be freely rotatable on the base 300.

The aperture 220 may be positioned within the recessed portion 222. In particular, as may be best seen in FIG. 17, the aperture 220 may be centrally positioned within the recessed portion 222. As may be best seen in FIG. 17 with reference also to FIG. 13, the aperture 222 in the lower portion 210 of the seat shell 200 may be shaped complementary to the post 324 and the flange(s) of the projection 320 of the base 300. In this way, the post 324 and the flange(s) of the projection 320 of the base 300 may be at least partially received through the aperture 220. Put another way, at least a portion of the post 324 and the flanges 326 of the projection 320 may be received through the aperture 220. As a result, the seat shell 200 may be better supported and stabilized on the base 300.

The specific shapes of the aperture 220 and the post 324 and flange(s) 326 of the projection 320 permit the seat shell 200 to be removable or detachable from base 300. In particular embodiments, the aperture 220 is oriented at an angle with respect to the first and second sides 202, 204 of the seat shell 200 (in comparison to the projection 320 illustrated in FIG. 12 and FIG. 13, which includes flanges 326 that extend outwardly away from the post 324 toward the first and second sides 302, 304 of the base 300). As a result, in such embodiments, the seat shell 200 is not removable or detachable from base 300 in either the forward-facing position or the rearward-facing position.

With reference to FIG. 17 and FIG. 18, the seat shell 200 may include one or more engagement features. For example, as shown in FIG. 17 and FIG. 18, an upper engagement feature 230 may be positioned proximate the rear end 208 of the seat shell 200. In particular, the upper engagement feature 230 may be positioned on the seat back 250 of the seat shell 200. By way of non-limiting example, as may be best seen with reference to FIGS. 15A-B, the upper engagement feature 230 may be formed as a hook. In particular, the upper engagement feature 230 may be formed as an upward-pointing or upward-oriented hook (i.e., in the direction of arrow 50 in FIGS. 15A-B).

A rear engagement feature 231 may be positioned proximate the rear end 208 of the seat shell 200. In particular, the rear engagement feature 231 may be positioned proximate the location where the seat back 250 of the seat shell 200 meets the lower portion 210 of the seat shell 200. More specifically, the rear engagement feature 231 may be positioned proximate the locking projection 238 on the lower portion 210 of the seat shell 200. By way of non-limiting example, as may be best seen with reference to FIGS. 15A-B and FIG. 19, the rear engagement feature 231 may be formed as a hook. In particular, the rear engagement feature 231 may be formed as an upward-pointing or upward-oriented hook (i.e., in the direction of arrow 50 in FIGS. 15A-B).

A forward engagement feature 234 may be positioned proximate the forward end 206 of the seat shell 200. By way of non-limiting example, as may be best seen with reference to FIGS. 15A-B and FIG. 19, the forward engagement feature 234 may be formed as a hook. In particular, the forward engagement feature 234 may be formed as an upward-pointing or upward-oriented hook (i.e., in the direction of arrow 50 in FIGS. 15A-B).

A first lower engagement feature 232 may be positioned proximate the rear end 208 of the seat shell 200. In particular, the first lower engagement feature 232 may be positioned on the lower portion 210 of the seat shell 200 proximate the rear end 208 of the seat shell 200. More specifically, the first lower engagement feature 232 may be positioned between the rear engagement feature 231 and the aperture 220. By way of non-limiting example, as may be best seen with reference to FIGS. 15A-B and FIG. 20, the first lower engagement feature 232 may be formed as a hook. In particular, the first lower engagement feature 232 may be formed as an upward-pointing or upward-oriented hook (i.e., in the direction of arrow 50 in FIGS. 15A-B). It is to be understood that the first lower engagement feature 232 may be omitted in certain embodiments.

A second lower engagement feature 233 may be positioned proximate the forward end 206 of the seat shell 200. In particular, the second lower engagement feature 233 may be positioned on the lower portion 210 of the seat shell 200 proximate the forward end 206 of the seat shell 200. More specifically, the second lower engagement feature 233 may be positioned between the forward engagement feature 234 and the aperture 220. That is, the second lower engagement feature 233 may be positioned on an opposite side of the aperture 220 from the first lower engagement feature 232. By way of non-limiting example, as may be best seen with reference to FIGS. 15A-B and FIG. 19, the second lower engagement feature 233 may be formed as a hook. In particular, the second lower engagement feature 233 may be formed as an upward-pointing or upward-oriented hook (i.e., in the direction of arrow 50 in FIGS. 15A-B). It is to be understood that the second lower engagement feature 233 may be omitted in certain embodiments.

In preferred embodiments, the engagement features of the seat shell 200 are shaped complementary to the receiving features of the base 300. In this way, as described in detail herein, each of the receiving features of the base 300 is configured to engage a corresponding one of the engagement features of the seat shell 200 when the seat shell 200 is in the rearward-facing position or the forward-facing position. Engagement between the receiving features of the base 300 and corresponding ones of the engagement features of the seat shell 200 assists in providing structural integrity and stability to the car seat in certain situations, such as when the car seat undergoes significant movement or impact (e.g., during a car crash).

With reference back to FIG. 3, it should be understood that, when the seat shell 200 is in the forward-facing position: (a) the upper engagement feature 230 of the seat shell 200 engages with the upper receiving feature 330 of the base 300; (b) the rear engagement feature 231 of the seat shell 200 engages with the intermediate receiving feature 331 of the base 300; and (c) the first lower engagement feature 232 of the seat shell 200 engages with the lower receiving feature 332 of the base 300. In this way, interaction between these engagement features 230, 231, 232 of the seat shell 200 and these receiving features 330, 331, 332 of the base 300 assist in retaining the seat shell 200 into the forward-facing position in certain situations, such as when the car seat undergoes significant movement or impact (e.g., during a car crash). As can be further understood, when the seat shell 200 is in the forward-facing position, the forward engagement feature 234 of the seat shell 200 and the second lower engagement feature 233 of the seat shell 200 do not engage the base 300.

Conversely, with reference back to FIG. 5, it should be understood that, when the seat shell 200 is in the rearward-facing position: (a) the forward engagement feature 234 of the seat shell 200 engages with the intermediate receiving feature 331 of the base 300; and (b) the second lower engagement feature 233 of the seat shell 200 engages with the lower receiving feature 332 of the base 300. In this way, interaction between these engagement features 233, 234 of the seat shell 200 and these receiving features 331, 332 of the base 300 assist in retaining the seat shell 200 into the rearward-facing position in certain situations, such as when the car seat undergoes significant movement or impact (e.g., during a car crash). As can be further understood, when the seat shell 200 is in the rearward-facing position, the upper engagement feature 230 of the seat shell 200, the rear engagement feature 231 of the seat shell 200, and the first lower engagement feature 232 of the seat shell 200 do not engage the base 300. Additionally, when the seat shell 200 is in the rearward-facing position, the upper receiving feature 330 of the base 300 does not engage the seat shell 200.

The rear and forward engagement features 231, 234 of the seat shell 200 may be configured to generally travel along the support ledge 358 of the base 300 as the seat shell 200 is rotated with respect to the base 300. More specifically, the rear and forward engagement features 231, 234 of the seat shell 200 may be configured to travel just above or on top of the support ledge 358 of the base 300 as the seat shell 200 is rotated with respect to the base 300.

As may be best seen in FIG. 17 and FIG. 18, the rear engagement feature 231 of the seat shell 200 may include a detent or aperture 231a. The forward engagement feature 234 of the seat shell 200 may also include a detent or aperture 234a. The apertures 231a, 234a of the rear and forward engagement features 231, 234 may be configured to engage with the base 300 as the seat shell 200 is rotated with respect to the base 300. In particular, the apertures 231*a*, 234*a* of the rear and forward engagement features 231, 234 may be configured to engage with the base 300 as the seat shell 200 is rotated with respect to the base 300 and the rear and forward engagement features 231, 234 travel along the support ledge 358 of the base 300. More specifically, each of the apertures 231*a*, 234*a* of the rear and forward engagement features 231, 234 may be configured to engage with a corresponding one of the first and second retainment features 342, 344 of the base 300 (e.g., on the support ledge 358 of the base 300).

When the seat shell 200 is in an intermediate position facing a first direction, the aperture 231*a* of the rear engagement feature 231 engages the first retainment feature 342 of the base 300 and the aperture 234*a* of the forward engagement feature 234 engages the second retainment feature 344 of the base 300. When the seat shell 200 is rotated to an intermediate position facing an opposite, second direction, the aperture 234*a* of the forward engagement feature 234 engages the first retainment feature 342 of the base 300 and the aperture 231*a* of the rear engagement feature 231 engages the second retainment feature 344 of the base 300. In this way, interaction between the apertures 231*a*, 234*a* of the rear and forward engagement features 231, 234 of the seat shell 200 and the first and second retainment features 342, 344 of the base 300 retain the seat shell 200 in the intermediate position(s). A user may then apply a relatively small amount of force to rotate the seat shell 200 out of the intermediate position(s). That is, actuation of the handle is not necessary (or even useful) to overcome the interaction between the engagement features of the seat shell 200 and the retainment features of the base 300 and rotate the seat shell 200 out of the intermediate position(s).

Although the engagement features of the seat shell 200 are described herein as including a detent or aperture that engages with a corresponding retainment feature of the base 300 that is in the form of a projection or nub, it should be understood that these structures could be reversed. That is, the rear and forward engagement features of the seat shell 200 could be formed with projections or nubs and the retainment features of the base 300 could be formed as detents or apertures that engage the projections or nubs of the engagement features.

Figure 19:
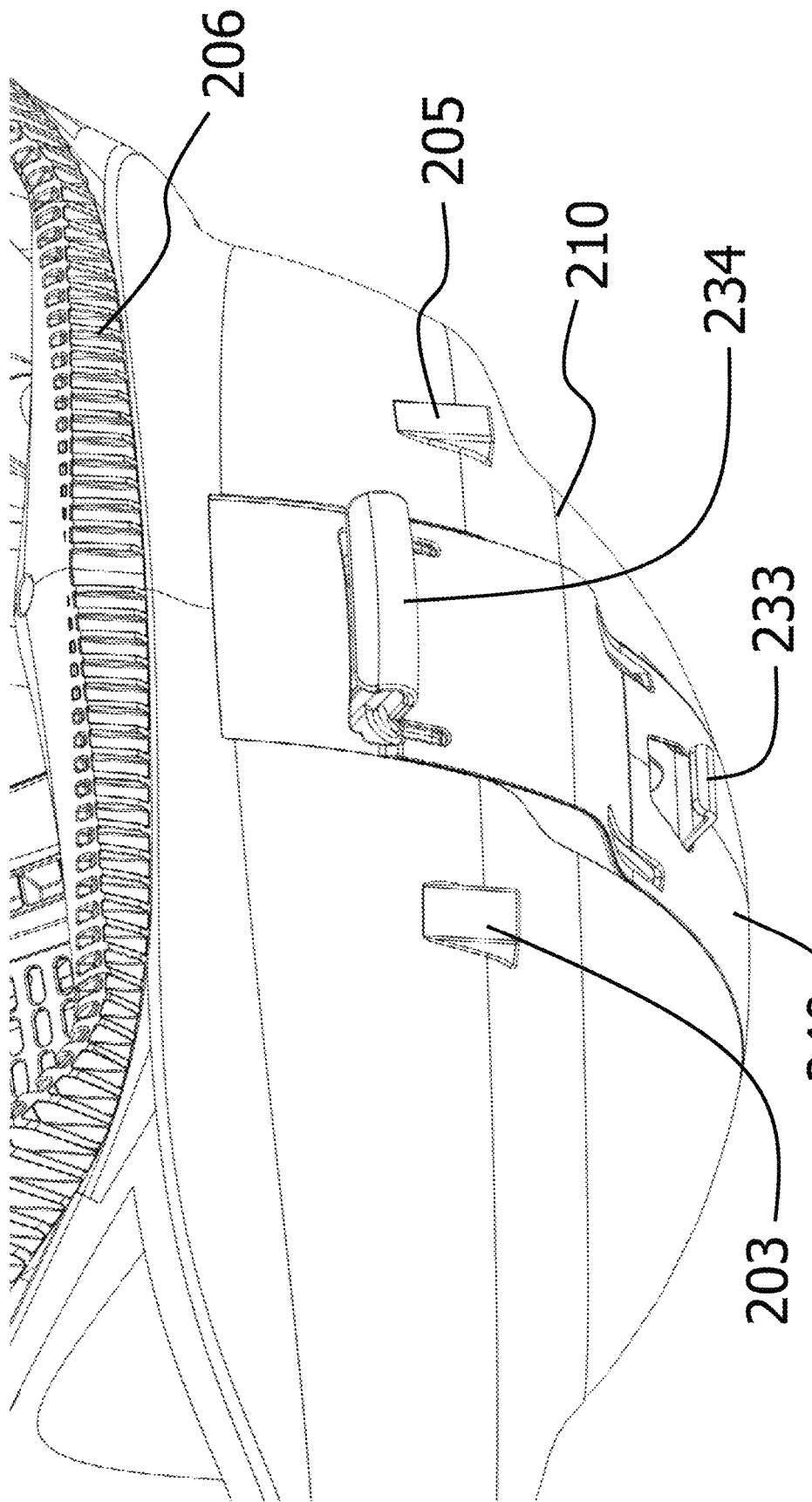
FIG. 19 is a perspective view of the forward end of the lower portion of the seat shell of FIG. 14.
Figure 20:
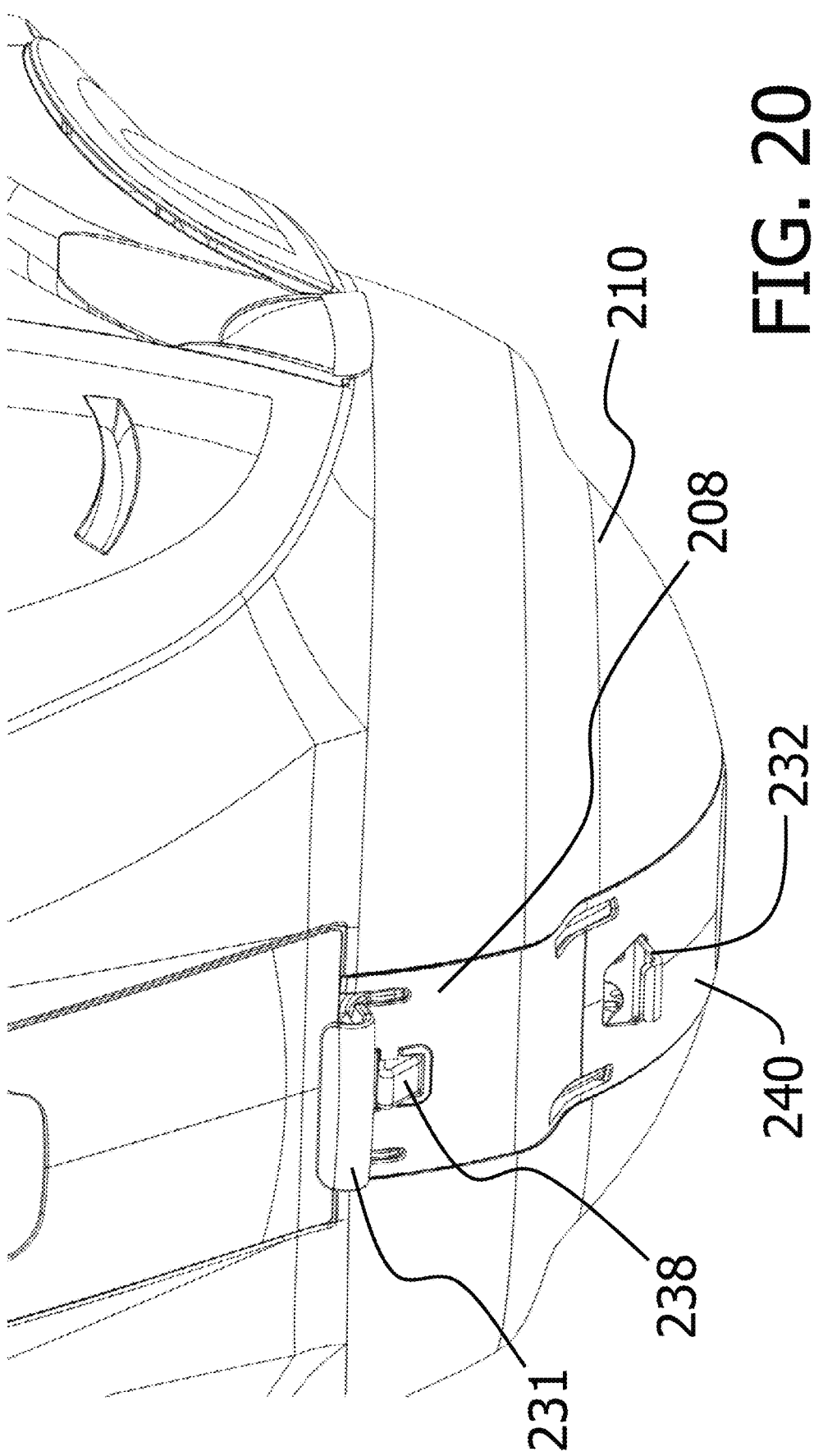
FIG. 20 is a perspective view of the rear end of the lower portion of the seat shell of FIG. 14.

With reference now to FIG. 18 and FIG. 19, the lower portion 210 of the seat shell 200 may include one or more abutment features. In the exemplary embodiment illustrated in FIG. 18 and FIG. 19, the lower portion 210 of the seat shell 200 includes a first abutment feature 203 positioned on the first side 202 of the seat shell 200 and a second abutment feature 205 positioned on the opposite, second side 204 of the seat shell 200. More specifically, in this embodiment, the first and second abutment features 203, 205 are each positioned proximate the forward end 206 of the seat shell 200. The first and second abutment features 203, 205 generally operate so as to prevent rotation of the seat shell 200 with respect to the base 300 when the seat shell 200 is in a reclined position (e.g., a partially or intermediate-reclined position). In particular, the first and second abutment features 203, 205 may be configured to prevent rotation of the seat shell 200 with respect to the base 300 when the seat shell 200 is in any of a plurality of reclined positions (e.g., a partially or intermediate-reclined position). More specifically, the first and second abutment features 203, 205 may be configured to prevent rotation of the seat shell 200 with respect to the base 300 when the seat shell 200 is any reclined position except for a fully-reclined position. That is, in certain embodiments, the seat shell 200 may be configured to freely and fully (i.e., a full 360°) rotate with respect to the base 300 when the seat shell 200 is in the fully-reclined position. In particular embodiments, when the seat shell 200 is reclined with respect to the base 300 between the upright position and the fully-reclined position, such as in an intermediate-reclined position, the seat shell 200 may be prevented from freely and fully (i.e., a full 360°) rotating with respect to the base 300. Rather, in such particular embodiments, in the intermediate-reclined position, the seat shell 200 may only be capable of rotating about 90° in either direction with respect to the base 300. For example, in certain embodiments, when the seat shell 200 is in a partially reclined rearward-facing position (refer to FIG. 4 and FIG. 5), the seat shell may need to be placed in an upright position (e.g., as shown in FIG. 2 and FIG. 3 with respect to the forward-facing position) before the seat shell 200 can be fully rotated with respect to the base 300 into the forward-facing position. Placing the seat shell into the upright position before rotating the seat shell 200 with respect to the base 300 may help to ensure that the upper engagement feature 230 of the seat shell 200 is capable of engaging with the upper receiving feature 330 of the base 300.

Figure 21:
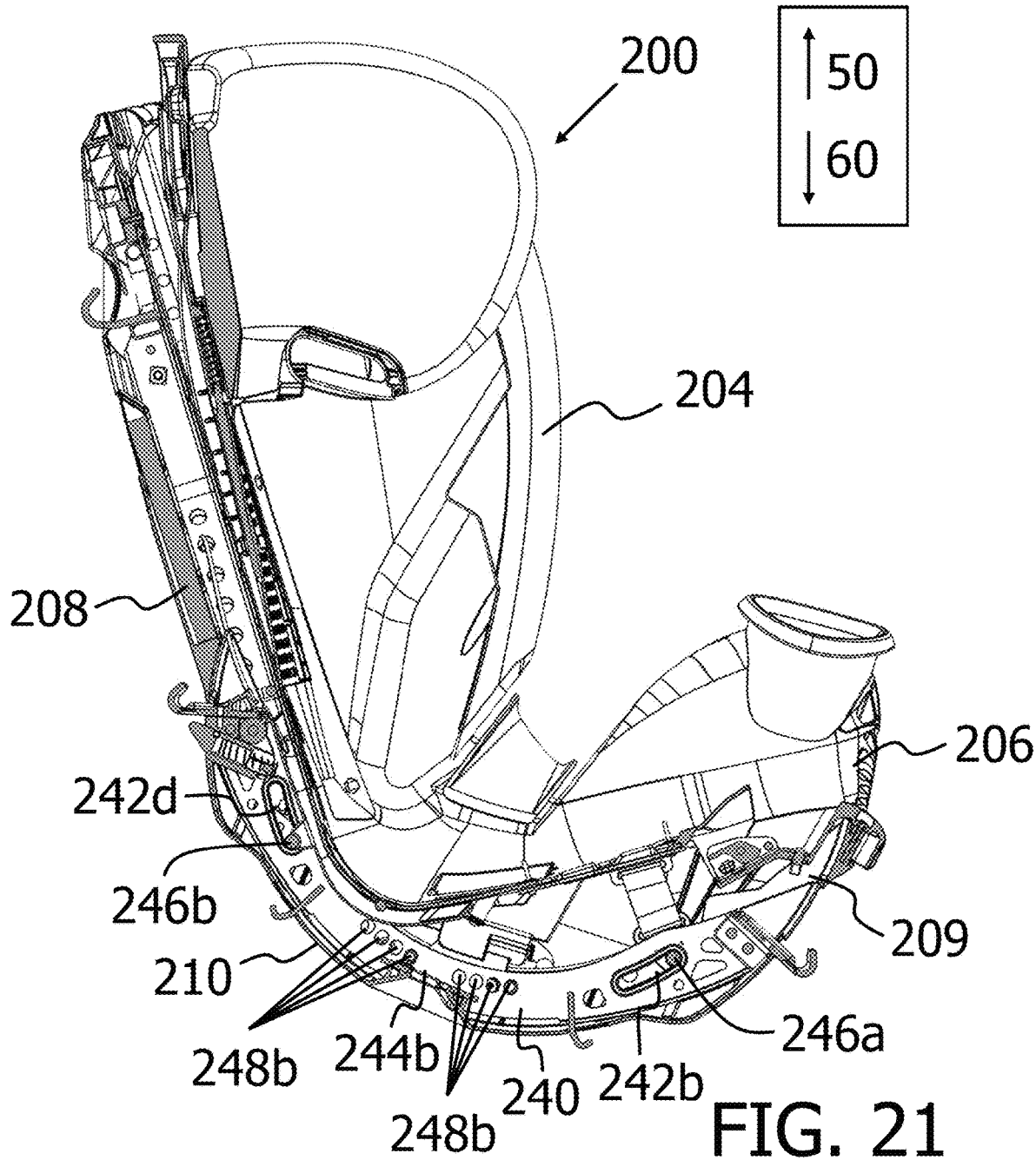
FIG. 21 is a first side cross-sectional view taken along line 21-21' of FIG. 16 showing features of the recline mechanism.
Figure 22:
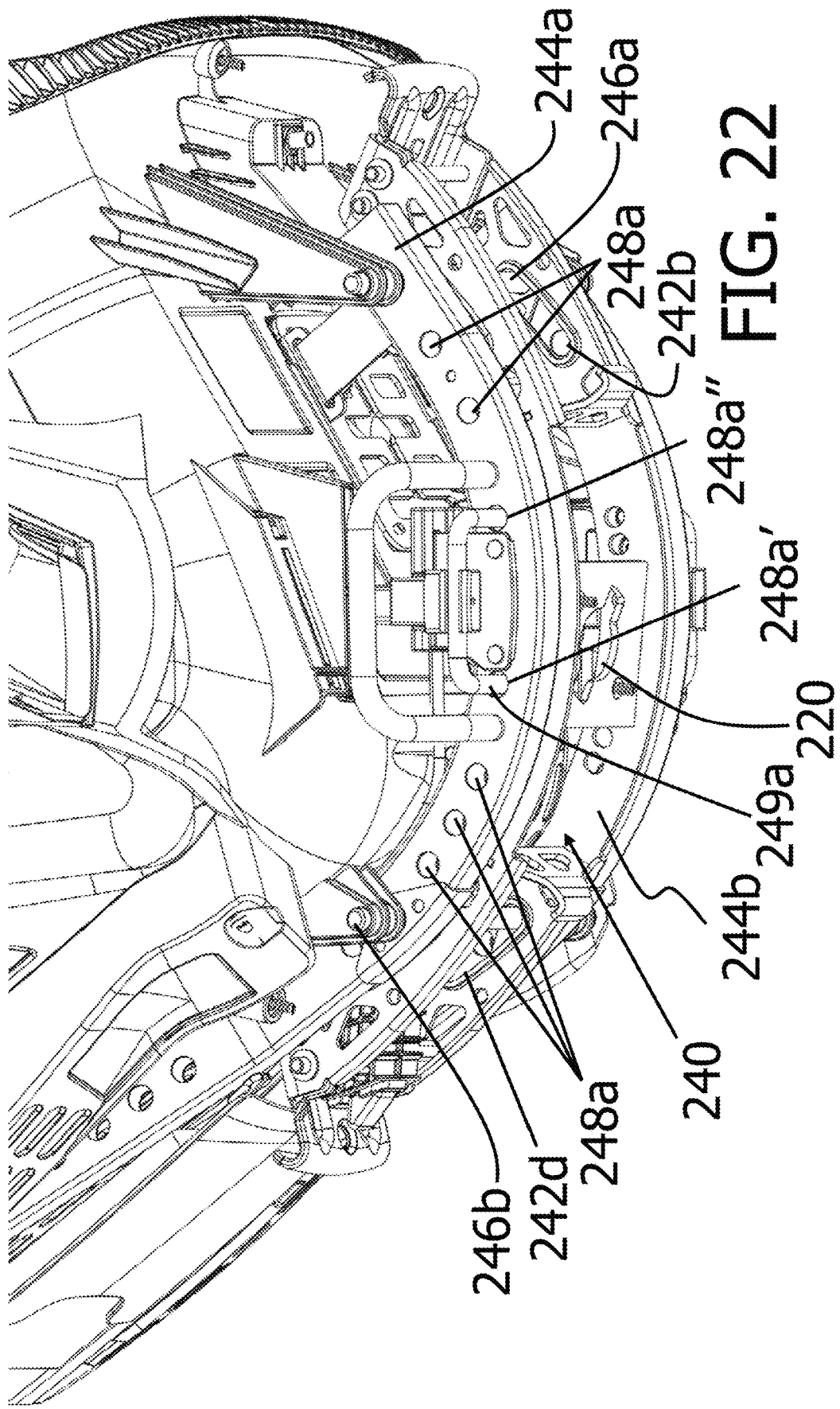
FIG. 22 is a is a first side perspective cutaway view of the lower portion of the seat shell of FIG. 14 showing features of the recline mechanism.

Turning now to FIGS. 21-23, the seat shell 200 may include a recline mechanism 240, which is also labeled in FIG. 16-20. FIG. 21 is a cross-sectional view taken along line 21-21' of FIG. 16 and showing features and details of the recline mechanism 240, and FIG. 22 and FIG. 23 are first and second side cutaway views, respectively, in which the outer surface 216 of the lower portion 210 of the seat shell 200 has been removed to show additional features and details of the recline mechanism 240. The recline mechanism 240 may generally operate so as to permit the seat shell 200 to be reclinable with respect to the base 300. In particular, the seat shell 200 may travel (e.g., slidably or otherwise) along a reclination path (e.g., an arcuate reclination path) defined by the recline mechanism 240. In this way, the complementary shapes of the lower portion 210 of the seat shell 200 and the receiving portion 310 of the base 300 may advantageously assist in smooth travel of the seat shell 200 as the seat shell 200 is reclined with respect to the base 300. In particular embodiments, the recline mechanism 240 may assist in ensuring that a substantially constant gap is maintained between the lower portion 210 of the seat shell 200 and the receiving portion 310 of the base 300 such that the interface between the seat shell 200 and the base 300 is maintained as the seat shell 200 is rotated and/or reclined with respect to the base 300, including as the seat shell 200 is rotated with respect to the base 300 while in a reclined position or upright position. This advantageously allows the seat shell 200 to be reclined and/or rotated with respect to the base 300 without any need to remove or detach the seat shell 200 from the base 300 or to uninstall or reinstall the seat shell 200 onto the base 300, including allowing the seat shell 200 to be rotated with respect to the base 300 while in a reclined position or upright position.

The recline mechanism 240 may be formed as a part of the seat bottom 209 of the seat shell 200. In particular, the recline mechanism 240 may be formed as a part of the lower portion 210 of the seat bottom 209 of the seat shell 200. The recline mechanism 240 may, in certain constructions, be integrally formed with the seat shell 200. In certain constructions, the recline mechanism 240 may include the aperture 220, as may be best seen in FIG. 22. In this way, the recline mechanism 240 may be supported on the base 300 (e.g., on the projection 320 in the receiving portion 310 of the base 300). The recline mechanism 240 may therefore be at least partially disposed within the receiving portion 310 of the base 300 when the seat shell 200 is attached to the base 300.

As may be best seen in FIG. 21 and FIG. 22, the recline mechanism 240 may be arcuate. Put another way, the recline mechanism 240 may generally be shaped similarly to the lower portion 210 of the seat shell 200 and may be convex. At least some of the engagement features of the seat shell 200 may connect to and extend outwardly away from the recline mechanism 240. The recline mechanism 240 may generally extend from proximate the forward end 206 of the seat shell 200 to proximate the rear end 208 of the seat shell. The recline mechanism 240 may generally be positioned approximately centrally between the first side 202 and the second side 204 of the seat shell 200. In certain constructions, the recline mechanism 240 may be positioned between the first and second abutment features 203, 205. In embodiments, the first and second abutment features 203, 205 are not directly connected to or positioned on the recline mechanism 240.

The recline mechanism 240 generally includes at least one track. The at least one track is generally formed as an elongate track such that a mechanism inserted therein or therethrough may generally travel along the elongate track. In the exemplary embodiment illustrated in FIG. 21 and FIG. 22, the recline mechanism 240 includes four tracks. In the illustrated exemplary embodiment, the tracks are defined in first and second arcuate bars 244a, 244b that are spaced apart from one another. In particular, each of the first and second bars 244a, 244b define a pair of tracks. For example, first bar 244a defines track 242a proximate the forward end 206 of the seat shell 200 and track 242c proximate the rear end 208 of the seat shell 200, as may be best seen in FIG. 22 and FIG. 23. Similarly, second bar 244b defines track 242b proximate the forward end 206 of the seat shell 200 and track 242d proximate the rear end 208 of the seat shell 200. In this exemplary embodiment, tracks 242a and 242c are positioned proximate the first side 202 of the seat shell 200, and tracks 242b and 242d are positioned proximate the second side 204 of the seat shell 200. Moreover, tracks 242a and 242b are generally positioned directly across from one another (e.g., equidistantly spaced between the forward and rear ends 206, 208 of the seat shell 200), and tracks 242c and 242d are likewise generally positioned directly across from one another (e.g., equidistantly spaced between the forward and rear ends 206, 208 of the seat shell 200). In this way, rod 246a generally extends through tracks 242a and 242b, and rod 246b generally extends through tracks 242c and 242d.

The track(s) of the recline mechanism 240 is configured to receive a rod therethrough. The rod is adapted for movement within the track as the seat shell 200 is reclined with respect to the base 300. For example, with reference again to FIG. 21 and FIG. 22, tracks 242a and 242b receive rod 246a therethrough, and tracks 242b and 242c receive rod 246b therethrough. Rod 246a is adapted for movement within tracks 242a and 242b (i.e., by moving along tracks 242a and 242b toward and away from the forward and rear ends 206, 208 of the seat shell 200). Similarly, rod 246b is adapted for movement within tracks 242c and 242d (i.e., by moving along tracks 242c and 242d toward and away from the forward and rear ends 206, 208 of the seat shell 200). The rod(s) moving within the track(s) advantageously allows the seat shell 200 to be reclined with respect to the base 300 without any need to remove or detach the seat shell 200 from the base 300 or to uninstall or reinstall the seat shell 200 onto the base 300.

The recline mechanism 240 generally defines a plurality of openings 248. Each of the plurality of openings 248 generally operates such that a mechanism inserted therein or therethrough is retained therein. In particular, each opening 248 or pair of openings 248 may define a discrete recline position for the seat shell 200 (e.g., an upright position, a fully-reclined position, an intermediate-reclined position). For example, in the exemplary embodiment illustrated in FIG. 21 and FIG. 22, eight openings are defined, which corresponds to four discrete recline positions (e.g., an upright position, a fully-reclined position, and two intermediate-reclined positions). Generally, the one or more openings (e.g., pair of openings) defined at one of the extreme ends of the openings corresponds to and defines an upright position, and the one or more openings (e.g., pair of openings) defined at the opposite extreme end corresponds to and defines a fully-reclined position. The remaining openings (e.g., pairs of openings) disposed between the extreme ends correspond to and define intermediate-reclined positions. Each of the intermediate-reclined positions and the fully-reclined position may all be considered reclined positions.

In the exemplary embodiment illustrated in FIG. 21 and FIG. 22, the recline mechanism 240 includes a first set of openings 248a and a second set of openings 248b, as may be best seen in FIG. 22. In the illustrated exemplary embodiment, the first and second sets of openings 248a, 248b are defined in the first and second arcuate bars 244a, 244b, respectively. In particular, each of the first and second bars 244a, 244b define a set of openings. For example, first bar 244a defines the first set of openings 248a, with individual ones of the openings being spaced apart from one another between the forward end 206 of the seat shell 200 the rear end 208 of the seat shell 200. Similarly, second bar 244b defines the second set of openings 248b, with individual ones of the openings being spaced apart from one another between the forward end 206 of the seat shell 200 and the rear end 208 of the seat shell 200.

The openings 248 of the recline mechanism 240 are configured to receive a tube therethrough. For example, with reference again to FIG. 22 and FIG. 23, openings 248a' and 248a" receive tube 249a therethrough, and openings 248b' and 248b" receive tube 249b therethrough. Tubes 249a and 249b are each adapted to retain the seat shell 200 in a selected one of the reclined positions as determined by which opening(s) into which the tube is inserted. The tube(s) of the recline mechanism 240 may generally be operatively connected to an actuator (not shown) that is selectively controlled by a user to disengage the tube from an opening of the recline mechanism 240 so as to recline the seat shell 200 with respect to the base 300. In this way, the amount of recline of the seat shell 200 with respect to the base 300 can be selectively controlled, and the seat shell 200 can be selectively reclinable into a plurality of positions (e.g., an upright position, a fully-reclined position, one or more intermediate-reclined positions).

While particular exemplary embodiments have been described, it is not intended that the claims be limited thereto, as it is intended that the claims be as broad in scope as the art will allow and that the specification be read likewise. That is, the foregoing description of specific embodiments will so fully reveal the general nature of the disclosure that others may, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It will be appreciated by those of ordinary skill in the art that the components, method steps and materials illustrated above may be varied by substitution of equivalent components, steps and materials capable of performing the same functions. It will also be appreciated by one of ordinary skill in the art that sizes and strengths of the components may be scaled up or down as required for specific purposes. The claims hereof are intended to encompass all such equivalent components, method steps and scales.

What is claimed is:

1. A car seat, comprising:
a base including a receiving portion;
a seat shell including a seat bottom having a top surface and a lower portion, the seat shell also including a seat back extending upwardly away from the seat bottom, the seat bottom lower portion interfacing with the receiving portion of the base, wherein the seat shell is removably attached to the base and rotatable with respect to the base such that the seat shell is selectively positionable between at least a rearward-facing position and a forward-facing position; and
a recline mechanism comprised of at least one track between the seat bottom top surface and the seat bottom lower portion, the recline mechanism configured to permit the seat shell to recline with respect to the base such that the seat shell is selectively reclinable between at least an upright position and at least one reclined position.

2. The car seat of claim 1 further comprising a rod, wherein the at least one track is configured to receive the rod therethrough, the rod adapted for movement within the track as the seat shell is reclined with respect to the base.

3. The car seat of claim 2, wherein the recline mechanism further defines a plurality of openings, each of the plurality of openings configured to selectively receive a tube of the seat shell therethrough for selectively positioning the seat shell in a discrete recline position, wherein one of the plurality of openings defines the upright position and another of the plurality of openings defines the at least one reclined position.

4. The car seat of claim 1, wherein the base is configured to lock rotation of the seat shell with respect to the base in each of the rearward-facing position and the forward-facing position and the car seat further comprises at least one selected from the following:
a first indicator on a first side of the base and a second indicator on an opposite, second side of the base, each of the first and second indicators of the base configured to indicate whether rotation of the seat shell is locked with respect to the base; and
at least one indicator on the seat shell, the at least one indicator of the seat shell configured to indicate whether rotation of the seat shell is locked with respect to the base.

5. The car seat of claim 1, wherein the base includes:
a backing portion extending upwardly away from the receiving portion; and
an upper tethering point proximate an upper edge of the backing portion of the base, the upper tethering point configured to remain stationary as the seat shell is rotated with respect to the base.

6. The car seat of claim 1, further comprising a first abutment feature on the lower portion of the seat shell proximate a first side thereof and a second abutment feature on the lower portion of the seat shell proximate an opposite, second side thereof, each of the first and second abutment features configured to prevent full 360° rotation of the seat shell with respect to the base when the seat shell is in an intermediate-reclined position.

7. The car seat of claim 1, wherein:
the seat shell includes one or more engagement features; and
the base includes one or more receiving features, the one or more receiving features being shaped complementary to the one or more engagement features;
wherein each of the one or more receiving features is configured to engage a corresponding one of the one or more engagement features when the seat shell is in the rearward-facing position and the forward-facing position.

8. The car seat of claim 7, wherein:
the one or more receiving features includes a first receiving feature and a second receiving feature and the one or more engagement features includes a first engagement feature and a second engagement feature;
the first receiving feature is positioned within the receiving portion of the base and is configured to engage the first engagement feature positioned on the lower portion of the seat shell; and
the second receiving feature is positioned adjacent the receiving portion of the base and is configured to engage the second engagement feature.

9. The car seat of any of claim 1, wherein:
the seat shell is further selectively positionable in an intermediate position between the rearward-facing position and the forward-facing position;
the base includes a first retainment feature on a first side of the base and a second retainment feature on an opposite, second side of the base;
the seat shell includes a first engagement feature at a forward end of the seat shell and a second engagement feature at an opposite, rear end of the seat shell; and
each of the first and second retainment features of the base are configured to engage a corresponding one of the first and second engagement features of the seat shell to retain the seat shell in the intermediate position.

10. The car seat of claim 9, wherein:
the first and second retainment features of the base are nubs; and
each of the first and second engagement features of the seat shell include an aperture configured to at least partially receive a corresponding one of the nubs.

11. The car seat of claim 1, wherein the car seat is configured to be installed in an associated vehicle using a tether and further comprises a belt path extending across the base and configured to receive the tether therealong, wherein the seat shell does not interfere with the belt path as the seat shell is rotated with respect to the base.

12. The car seat of claim 11, wherein the belt path is positioned above and rearward of the lower portion of the seat shell when the seat shell is in the forward-facing position.

13. The car seat of claim 1, wherein:
the lower portion of the seat shell is convex so as to at least partially define a dome shape; and the receiving portion of the base is concave so as to at least partially define a bowl shape.

14. The car seat of claim 1, wherein the receiving portion of the base is shaped complementary to the lower portion of the seat shell so as to retard the ability for debris to enter between the seat shell and the base as the seat shell is rotated with respect to the base.

15. The car seat of claim 1, wherein the car seat is configured to be installed in an associated vehicle using a tether and further comprises a belt lock off arm configured to engage the tether, the belt lock off arm movable between (a) an unlocked position in which the belt lock off arm does not engage the tether and (b) a locked position in which the belt lock off arm engages the tether, and the belt lock off arm including an indicator configured to indicate whether the belt lock off arm is in the unlocked position or the locked position.

16. The car seat of claim 1, further comprising:
a projection extending upwardly away from an inner surface of the receiving portion of the base; and
an aperture in the lower portion of the seat shell, the aperture configured to receive at least a portion of the projection therethrough.

17. The car seat of claim 16, wherein the projection includes:
a pedestal;
a post extending upwardly away from the pedestal; and
a plurality of flanges spaced apart from one another about the post and extending outwardly away from the post.

18. The car seat of claim 17, wherein:
an outer surface of the lower portion of the seat shell includes a recessed portion shaped complementary to the pedestal of the projection such that the pedestal of the projection is at least partially received in the recessed portion; and
the aperture in the lower portion of the seat shell is positioned within the recessed portion and is shaped complementary to the post and the plurality of flanges such that the plurality of flanges and at least a portion of the post is received through the aperture.

19. The car seat of claim 17, wherein the pedestal is shaped so as to at least partially define a cone shape extending upwardly away from the inner surface of the receiving portion of the base such that any debris that has collected between the seat shell and the base is retarded from substantially encumbering rotation of the seat shell with respect to the base.

20. The car seat of claim 1, further comprising:
a locking projection on the lower portion of the seat shell, the locking projection configured to engage the base to lock rotation of the seat shell with respect to the base.

21. The car seat of claim 20, wherein the locking projection ins configured to engage the base to lock rotation of the seat shell with respect to the base in each of the rearward-facing position and the forward-facing position.

22. The car seat of claim 20, further comprising:
a first handle positioned on a first side of the seat shell and a second handle positioned on an opposite, second side of the seat shell, each of the first and second handles operatively connected to the locking projection and configured to independently move the locking projection out of engagement with the base so as to unlock rotation of the seat shell with respect to the base.

23. The car seat of claim 1, wherein the recline mechanism is in the seat bottom.

* * * * *

UNITED STATES PATENT AND TRADEMARK OFFICE
CERTIFICATE OF CORRECTION

| | | |
|---|---|---|
| PATENT NO. | : 11,427,114 B2 | Page 1 of 1 |
| APPLICATION NO. | : 16/993365 | |
| DATED | : August 30, 2022 | |
| INVENTOR(S) | : Charles H. Keegan and Phillip Przybylo | |

It is certified that error appears in the above-identified patent and that said Letters Patent is hereby corrected as shown below:

In the Claims

Column 24, Line 35: delete "of any of" and insert -- of --.

Signed and Sealed this
Twenty-fifth Day of October, 2022

*Katherine Kelly Vidal*

Katherine Kelly Vidal
*Director of the United States Patent and Trademark Office*